United States Patent [19]

Wakefield et al.

[11] 3,757,947

[45] Sept. 11, 1973

[54] RESEARCH TEST DIALYZER SYSTEM

[75] Inventors: Albert W. Wakefield; Albert L. Babb, both of Seattle, Wash.

[73] Assignee: University of Washington, Seattle, Wash.

[22] Filed: June 25, 1969

[21] Appl. No.: 836,269

[52] U.S. Cl..................... 210/86, 210/95, 210/240, 210/321
[51] Int. Cl............................................. B01d 31/00
[58] Field of Search...................... 73/38, 64.3, 432; 210/22, 23, 321, 239, 240, 416, 86, 87, 90, 95

[56] References Cited
UNITED STATES PATENTS
2,715,097  8/1955  Guarino......................... 210/416 X
3,458,048  7/1969  Swenson............................ 210/321

OTHER PUBLICATIONS
Babb et al., "A New Concept in Hemodialyzer Membrane Support," from Transactions American Society for Artificial Internal Organs, Vol. X, pp. 31–37.

Babb et al., "The Determination of Membrane Permeabilities and Solute Diffusivities with Applications to Hemodialysis", from The Artificial Kidney (Chemical Engineering Progress Symposium Series), Vol. 64, pp. 59–68.

Primary Examiner—Frank A. Spear, Jr.
Attorney—Thomas W. Secrest

[57] ABSTRACT

A test unit and a method for testing membranes, membrane support systems and solution diffusivities for parallel and countercurrent flow of liquids, temperature effect on liquids, pressure effect on liquids with respect to a positive pressure and to a negative pressure, for two and three liquid systems, and for use under sterile and nonsterile conditions.

60 Claims, 19 Drawing Figures

INVENTORS
Albert L. Babb
Albert W. Wakefield
BY
VW Secrest
ATTORNEY.

INVENTORS
Albert L. Babb
Albert W. Wakefield
BY
VW Secrest
ATTORNEY

Patented Sept. 11, 1973
3,757,947
9 Sheets-Sheet 4
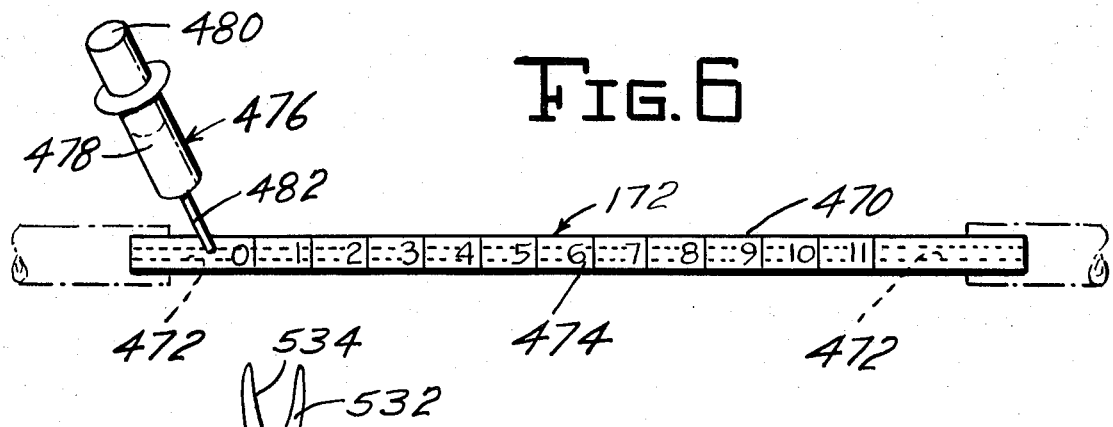
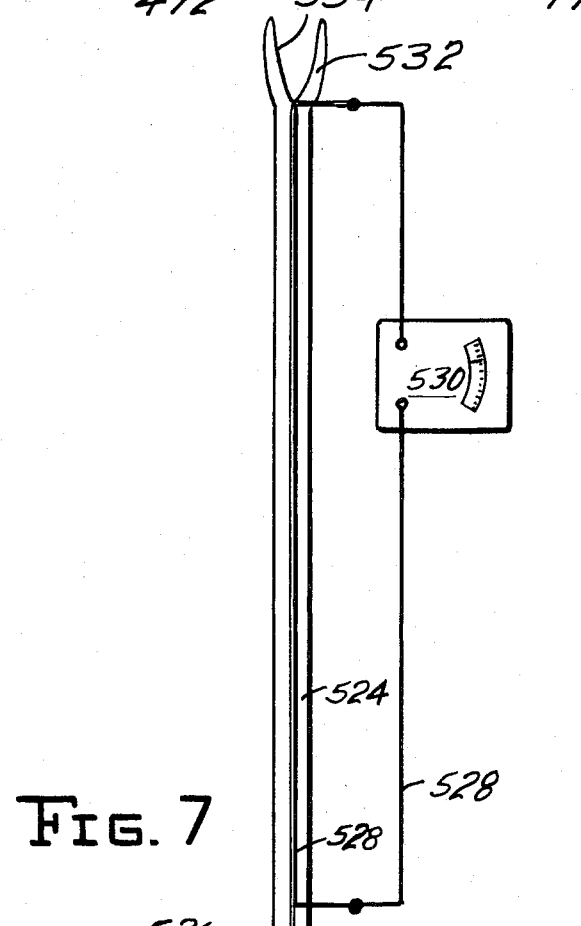
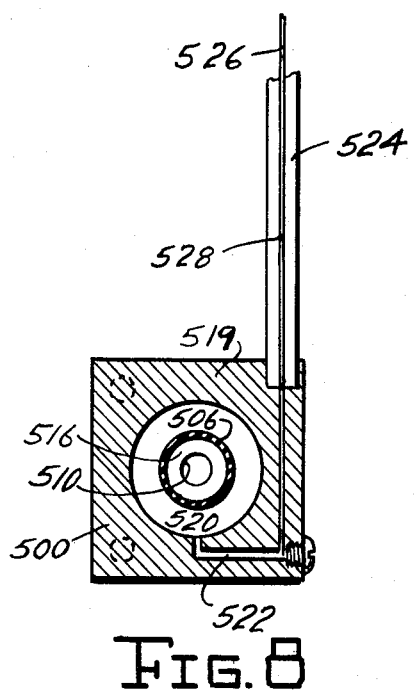
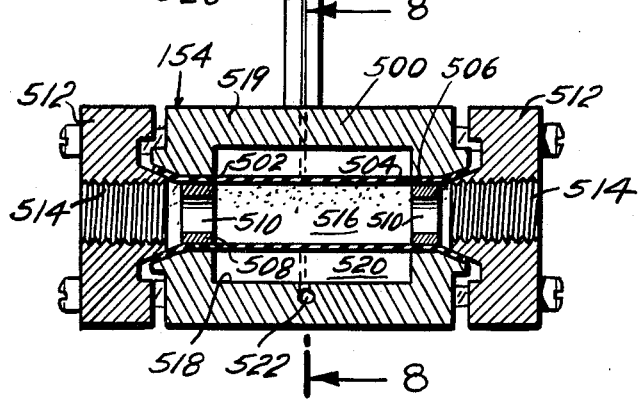
INVENTORS
Albert L. Babb
Albert W. Wakefield
BY
TW Secrest
ATTORNEY

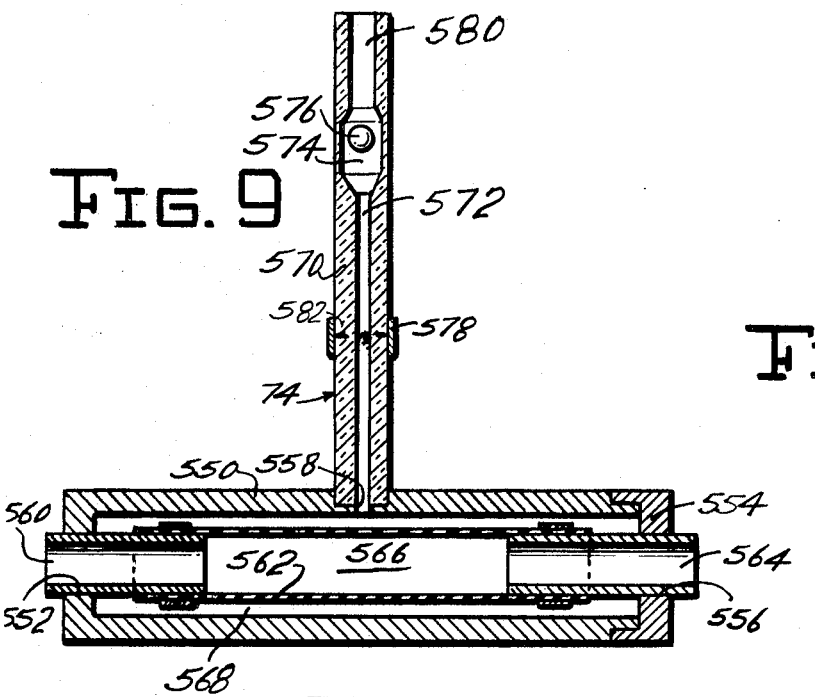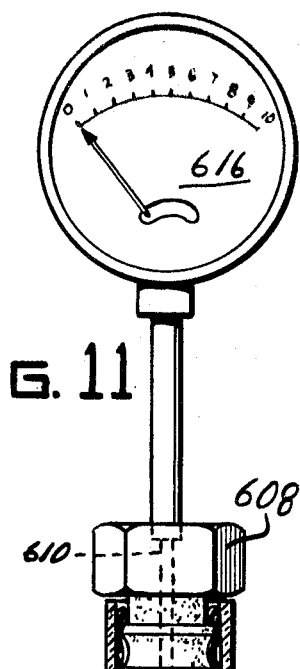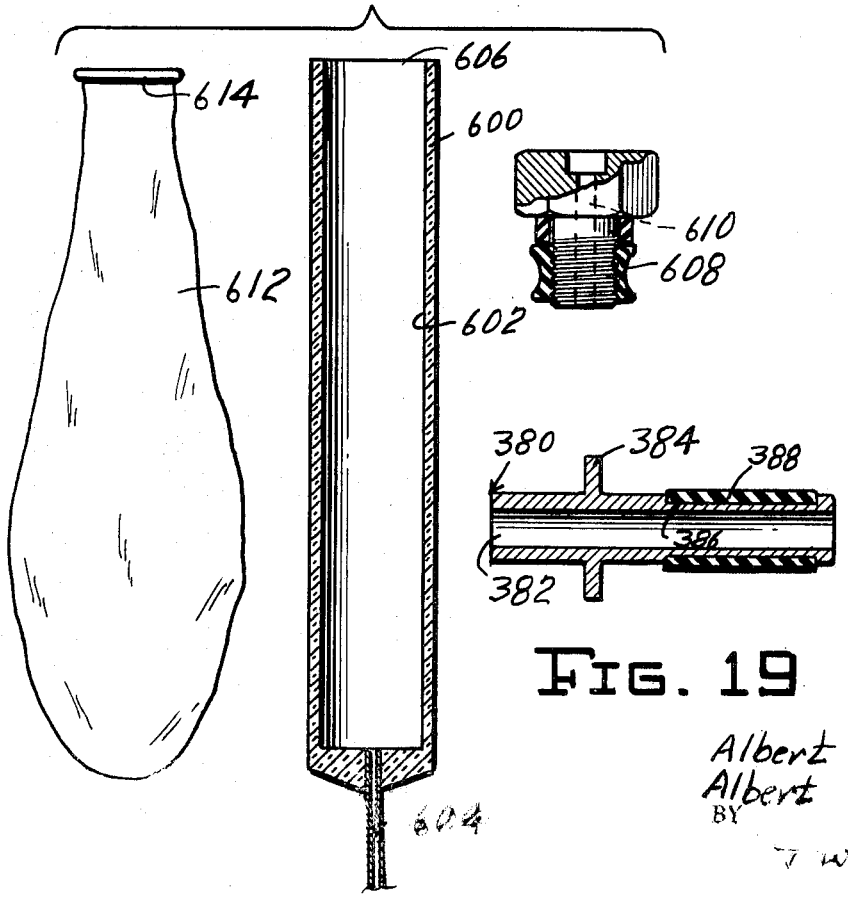

Patented Sept. 11, 1973

INVENTORS
Albert L. Babb
Albert W. Wakefield
BY
VW Seavest
ATTORNEY

Patented Sept. 11, 1973

INVENTORS
Albert L. Babb
Albert W. Wakefield
BY
T W Secrest
ATTORNEY

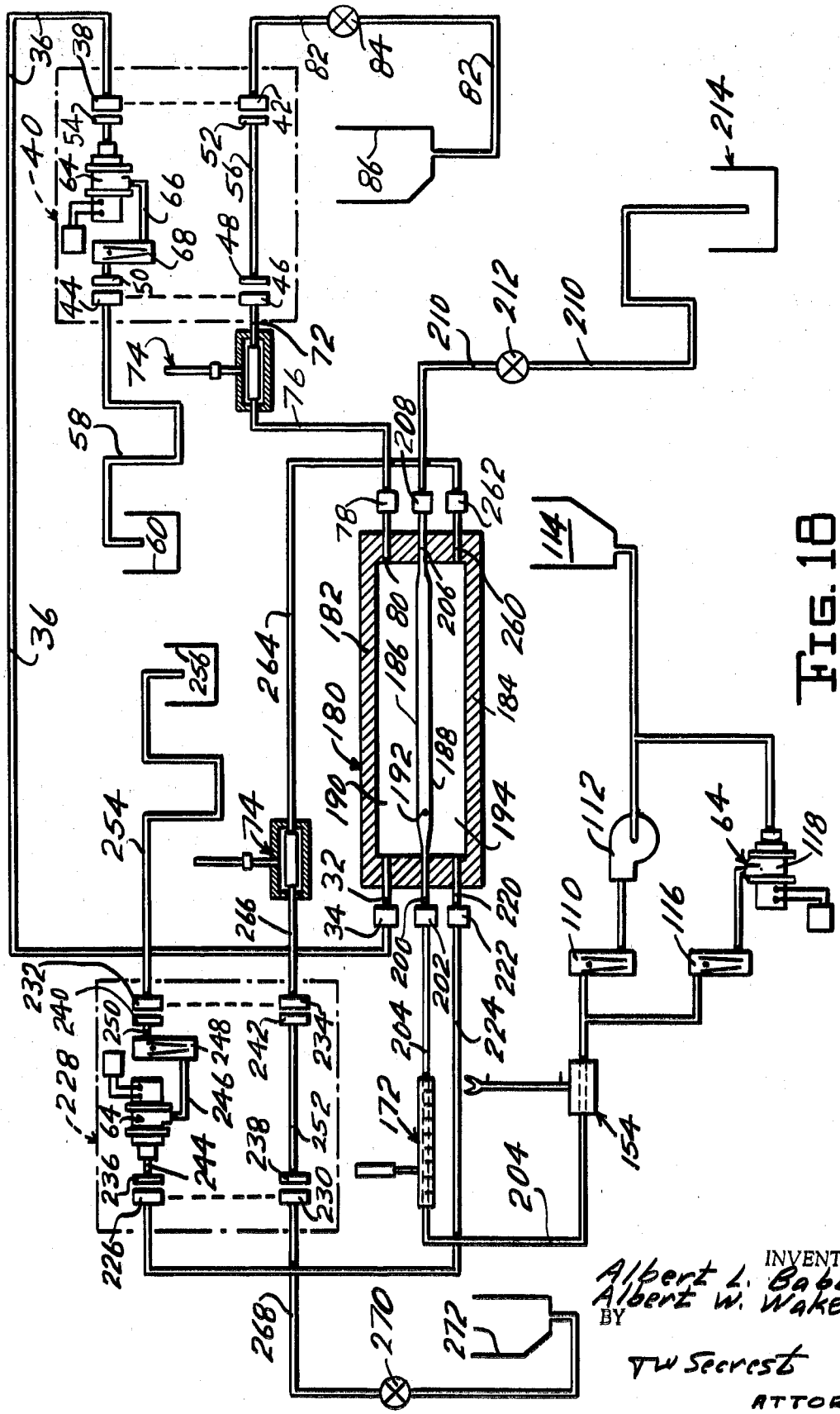

RESEARCH TEST DIALYZER SYSTEM

Dialysis is old. One place where dialysis is continuously conducted is in the human body. The transfer of material across membranes in the human body is continuously being done. This is also true for animals and some vegetable life. The exact methods of dialysis are not known. Dialysis itself is only partially understood.

There have been and there are simple dialysis units. These dialysis units are for the transfer of one material from a first liquid solution, across a membrane, to a second liquid solution.

With these simple dialysis units, it is not possible to secure reproducible analytical results.

From having studied and having worked with dialysis units, we have devised the following dialysis units and methods for using these dialysis units. With these units and these methods it is possible to determine mass transfer coefficients, optional flow rates of liquids in the dialyzer and geometry of the dialyzer, diffusivities of various solutions, film coefficients and to carry out ultrafiltration. Further, the analytical results realized are reproducible to such a degree that it is possible to derive various equations from experimental data. With these dialysis units and methods it is possible to test various membranes, various membrane support systems, to determine solute diffusivities, to use parallel or countercurrent flow, to determine the effect of temperature on diffusivity, to determine the effect of pressure on the above factors, and to use two and three liquid systems to determine diffusivity and transfer coefficients under various conditions. Also, it is possible to use these dialysis units and these methods under sterile conditions and also under non-sterile conditions.

With this background with dialysis solutions and the methods of dialyzing, it is an object of this invention to provide a compact test dialyzer; which test dialyzer is easy to use by an inexperienced operator; which test dialyzer is easy to transport from one place to another place; to provide a test dialyzer having the ability to give results of a high accuracy; to provide a test dialyzer having the ability to realize results and which results are not available with respect to presently available commercial equipment; to provide a test dialyzer which makes it possible to secure reproducible parameters; to provide a test dialyzer which may have a positive pressure or a negative pressure or a combination of positive pressure; to provide a test dialyzer in which there may be variable flow rates of liquid; to provide a test dialyzer having countercurrent and parallel flow; to provide a test dialyzer which makes it possible to test various membranes and which membranes may be of various materials and of various thicknesses; to provide a test dialyzer for precision control for gas absorbtion analysis; to provide a dialyzer to study the effect of film thickness; to provide a dialyzer for the precision determination of parameters; to provide a dialyzer and method for the unsteady state permeability determination by a single membrane method, by a double membrane method and by a double channel height method; to provide a test dialyzer and method for dynamic permeability differential; to provide a test dialyzer for solute diffusivity determination; to provide a test dialyzer and method for in vivo application; to provide a test dialyzer with the ability to vary film thickness while a liquid is flowing in the dialyzer; to provide a test dialyzer of a relatively low cost; to provide a test dialyzer which is easy to maintain in operating condition; to provide a test dialyzer which makes it possible to determine the diffusivities of liquids; to provide a test dialyzer which makes it possible to determine the diffusivity of solutes in blood in vivo; and, to provide a test dialyzer for determining mass transfer coefficients.

These and other important objects and advantages of the invention will be more particularly brought forth with reference to the accompanying drawings, the detailed specification of the invention and the appended claims.

Figure 3:
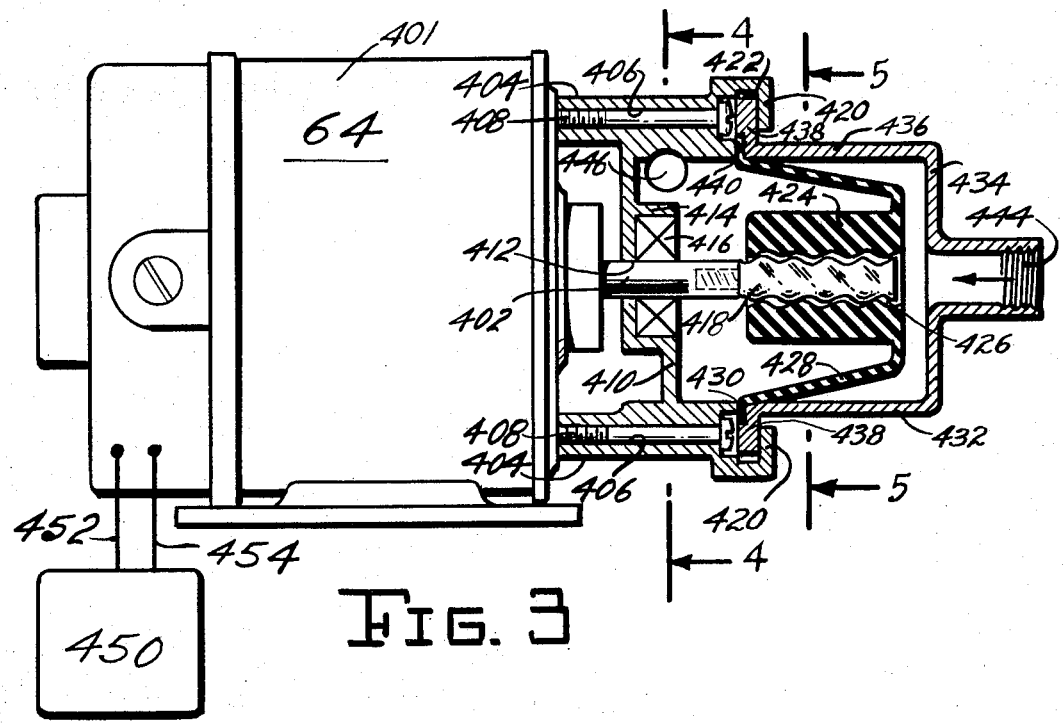
FIG. 3 is a fragmentary, partially in cross-sections of a helix pump having a direct current shunt motor and a torque controller therefor, and a quick interchange for the rotor and the stator of said helix pump.
Figures 4, 5:
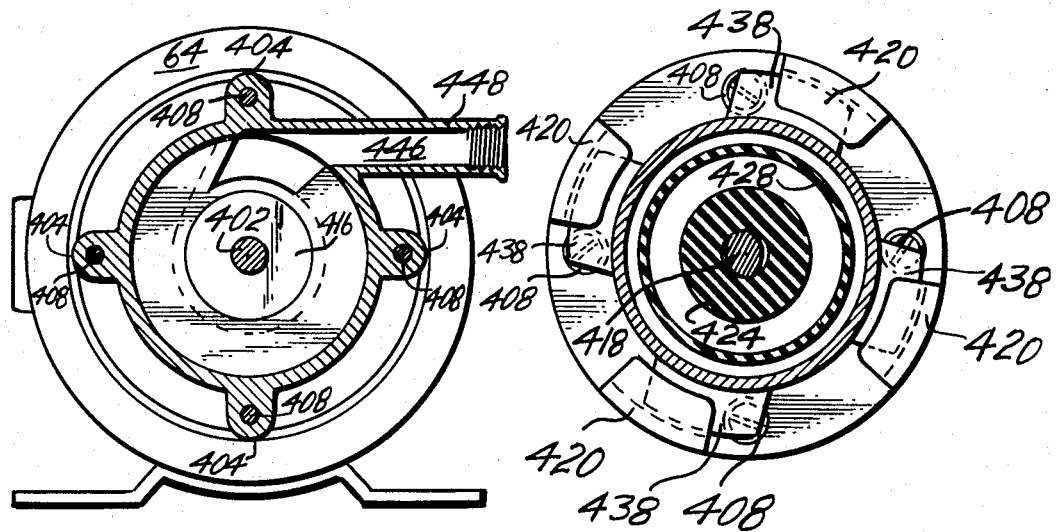
Figure 12:
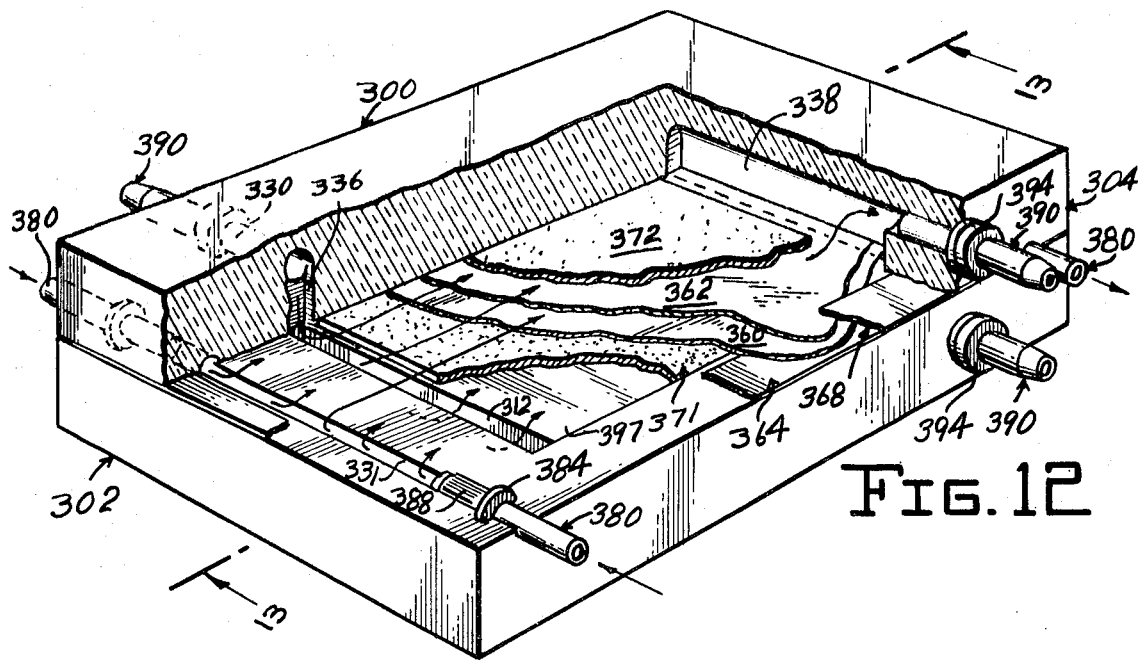
Figure 13:
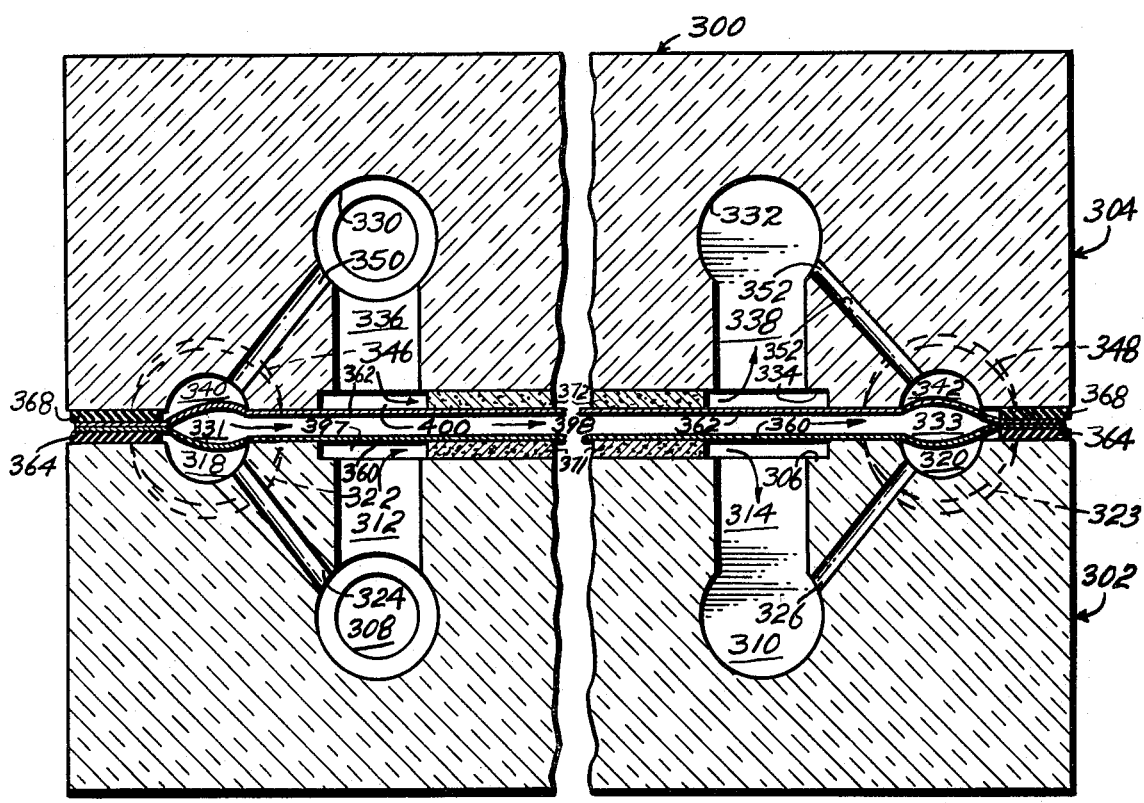
Figure 14:
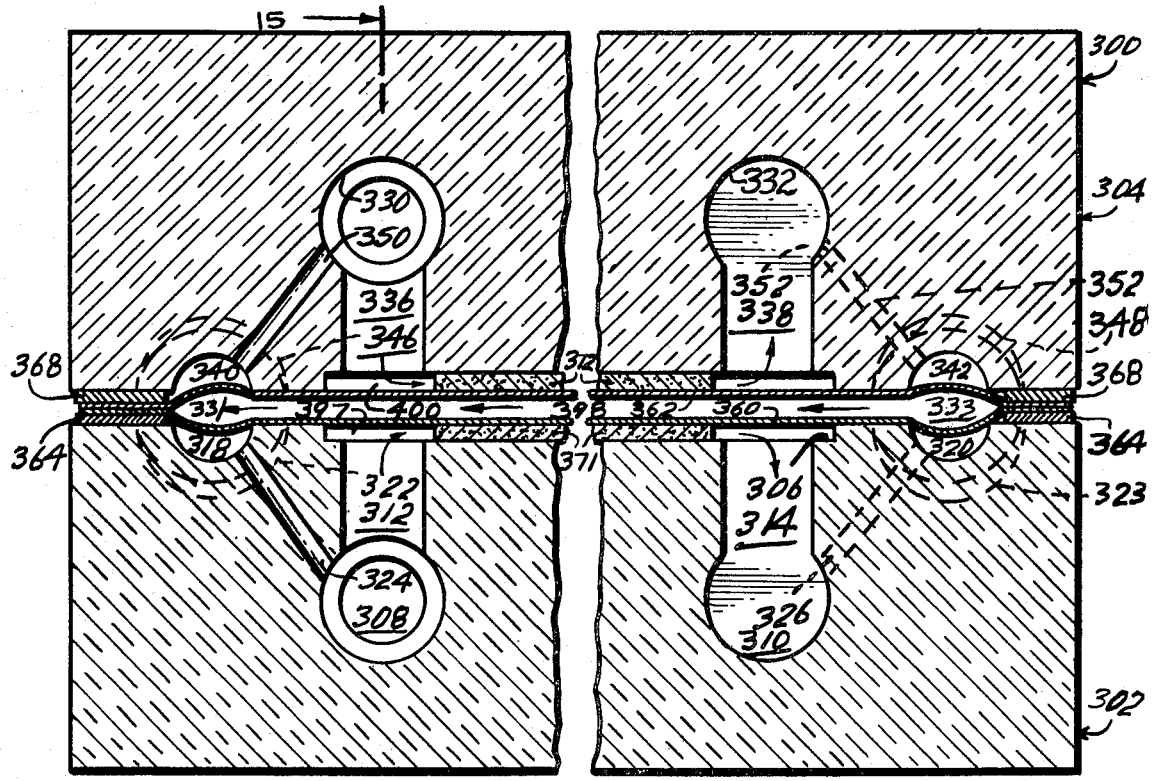
Figure 15:
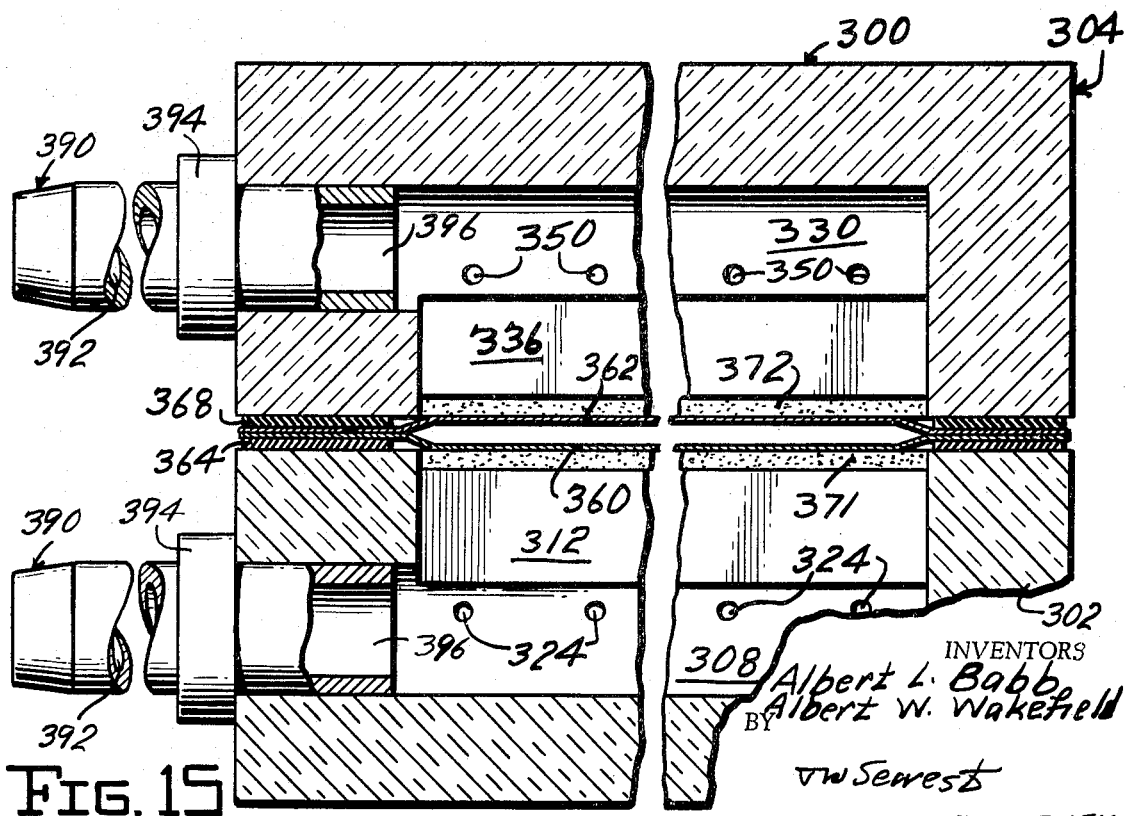
Figure 16:
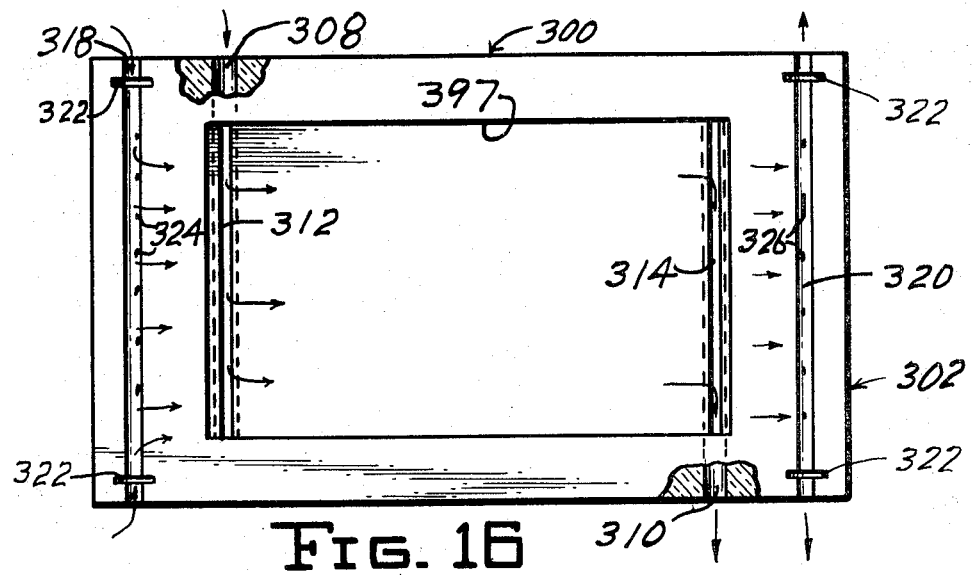
Figure 17:
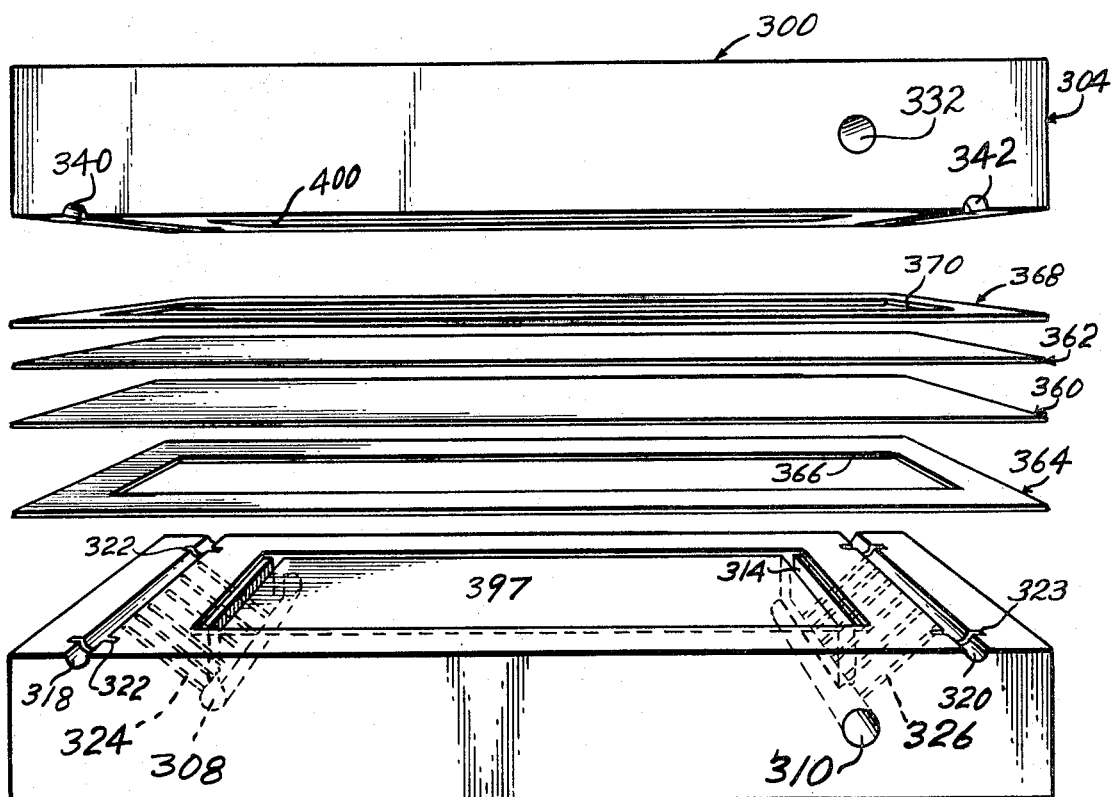

FIG. 4, taken on line 4—4 of FIG. 3, is a vertical cross-sectional view illustrating the outlet flow channel for the helix pump;

FIG. 5, taken on line 5—5 of FIG. 3, is a vertical lateral cross-sectional view of the helix pump and illustrates the rotor and the stator and the quick disconnect for readily changing the stator of the helix pump;

FIG. 6 is an illustration of a flow meter for determining the rate of flow of liquid such as blood;

FIG. 7 is a fragmentary illustration, partially in cross-section, of a flow through transducer and illustrates the flow through compartment and the compartment in which there is stored the liquid for varying the electrical characteristics of the transducer;

FIG. 8, taken on line 8—8 of FIG. 7, is a vertical lateral cross-sectional view of the flow through transducer and illustrates the flow through compartment, the compartment in which the liquid for varying the characteristics of the electrical transducer is stored, and the capillary tube of the transducer;

FIG. 9 is a cross-sectional view of a flow through galvanometer and illustrates a housing, the flow through compartment and the storage compartment for the liquid of the flow through galvanometer;

FIG. 10 is an exploded view of a pressure isolator and illustrates the housing, the cap for the housing and the flexible partition for dividing the housing into a first compartment and a second compartment;

FIG. 11, partially in longitudinal cross-section, is an illustration of the flow through pressure galvanometer and illustrates the housing, the flexible diaphragm and the pressure gauge;

FIG. 12, partially in cross-section, is an isometric view of a test dialyzer and illustrates two membranes, membrane supports, and which membranes in conjunction with the plates of the test dialyzer define three compartments;

FIG. 13, taken on line 13—13 of FIG. 12, is a longitudinal, vertical cross-sectional view of the test dialyzer and illustrates the two membranes, the two membrane supports, the inlet ports and the outlet ports, and illustrates the three compartments of the test dialyzer and the fluids in said test dialyzer flowing in parallel flow;

FIG. 14 is a vertical cross-sectional view of the test dialyzer and is similar to FIG. 13 except that the two fluids are flowing in countercurrent flow;

FIG. 15, taken on line 15—15 of FIG. 14, is a vertical cross-sectional view and illustrates the inlet ports for the test dialyzer, the two membranes, the membrane supports and the three compartments defined by the two membranes and the plates of the test dialyzer, and the spacing gaskets between the plates and the membranes for determining the channel height of the fluids in the middle compartment;

FIG. 16 is an illustration of parallel flow of the liquids in the test dialyzer and illustrates the inlet port and the outlet port for said liquid;

FIG. 17 is an exploded view of the test dialyzer and illustrates the plates, the gaskets for spacing the membranes from the plates and the membranes; however, there is not illustrated the attachments for the inlet and the outlet ports of the test dialyzer;

FIG. 18 is a schematic illustration of another research test dialyzer system and which dialyzer has three compartments and in which dialyzer it is possible to have a first fluid in the first compartment, a second fluid in the second compartment and a third fluid in the third compartment so as to have three different fluids for simultaneously transferring material across two different interfaces, and which research test dialyzer system makes it possible to exert positive pressure or negative pressure or a mixture of positive and negative pressure in the dialyzer; and, FIG. 19 is a longitudinal cross-sectional view of the inlet tube for introducing a fluid between two membranes in the dialyzer and which tube has a shoulder for definitely positioning the tube in the test dialyzer and which shoulder, in conjunction with the plates of the test dialyzer makes it possible to align said plates with each other.

In dialysis there may be one or two or three or more solutions. The number of solutions will depend upon the apparatus and the application of the apparatus to solving the problem at hand or to assist in gathering information. In dialysis there is a transfer of a chemical such as an electrolyte across a membrane. The permeability of the membrane will vary depending upon the material of the membrane, the thickness of the membrane, the temperature, the pressure on each side of the membrane and the manner in which the membrane has been previously treated. A dialysate solution may be considered to be the donee solution for receiving the chemical or electrolyte which is being trans-ferred across the membrane. The solute may be considered to be the donor solution and comprises the chemical or electrolyte which is being transferred across the membrane. In a two liquid system, the two liquids may have the same carrier solution and one liquid may have an electrolyte and one liquid may not have an electrolyte. Also, in a two liquid system, the carrier may be the same in both liquids and both liquids may contain the same electrolyte or elecytrolytes but at different concentrations. The liquid and the chemical or electrolyte may be referred to as the solution and the solute. Also, in two liquid solution, the carrier liquid may be different for each solution and the electrolytes in each solution may be different. This can be extended to a three or more liquid solution. For example, in a three liquid solution, the carrier may be the same in all three liquids, and the electrolytes may be the same in all three liquids but at different concentrations. Or the electrolytes may be different in all three solutions. Further, in a three solution system, the carriers may be different, but the electrolytes may be the same or the electrolytes may be different. There exists a large number of possibilities for using the same carrier or different carrier, for using the same electrolytes or different electrolytes, and various combinations of carriers and electrolytes. One of the interesting studies is the study of blood and the transfer of electrolytes from the blood to other solutions and also the transfer of electrolytes from other solutions to the blood.

In the flowing of the solutions through the dialysis unit or the dialyzer, it is necessary to have the flow rate of the solution sufficiently high to have turbulence or mixing in the dialyzer so as to lessen the effect of local concentration gradients near the membrane. The local concentration gradient contributes to what is known as film resistance. For example, in a two liquid system, the first liquid may be water and the second liquid may be a solution of water and sodium chloride. In a dialyzer, the sodium chloride is going to be transferred from the dialyso solution or the donor solution or the second solution to the dialysate solution or the first solution. Again, the second solution is a solution of sodium chloride and water while the first solution is water. At the membrane of substantially the interface of the first solution and the second solution, the concentration of the sodium chloride in the second solution is less than the concentration in the main body in the second solution while the concentration of the sodium chloride at the interface in the first solution is greater than the concentration of the sodium chloride in the main body of the first solution. This concentration gradient creates mass transfer resistances. Therefore, it is necessary to have a sufficiently high flow rate to have mixing of each solution to approximate a homogenous solution. Therefore, it is necessary to have a sufficiently high flow rate of the solution in the dialyzer to minimize local concentration gradients and to minimize mass transfer resistances.

Figure 2:
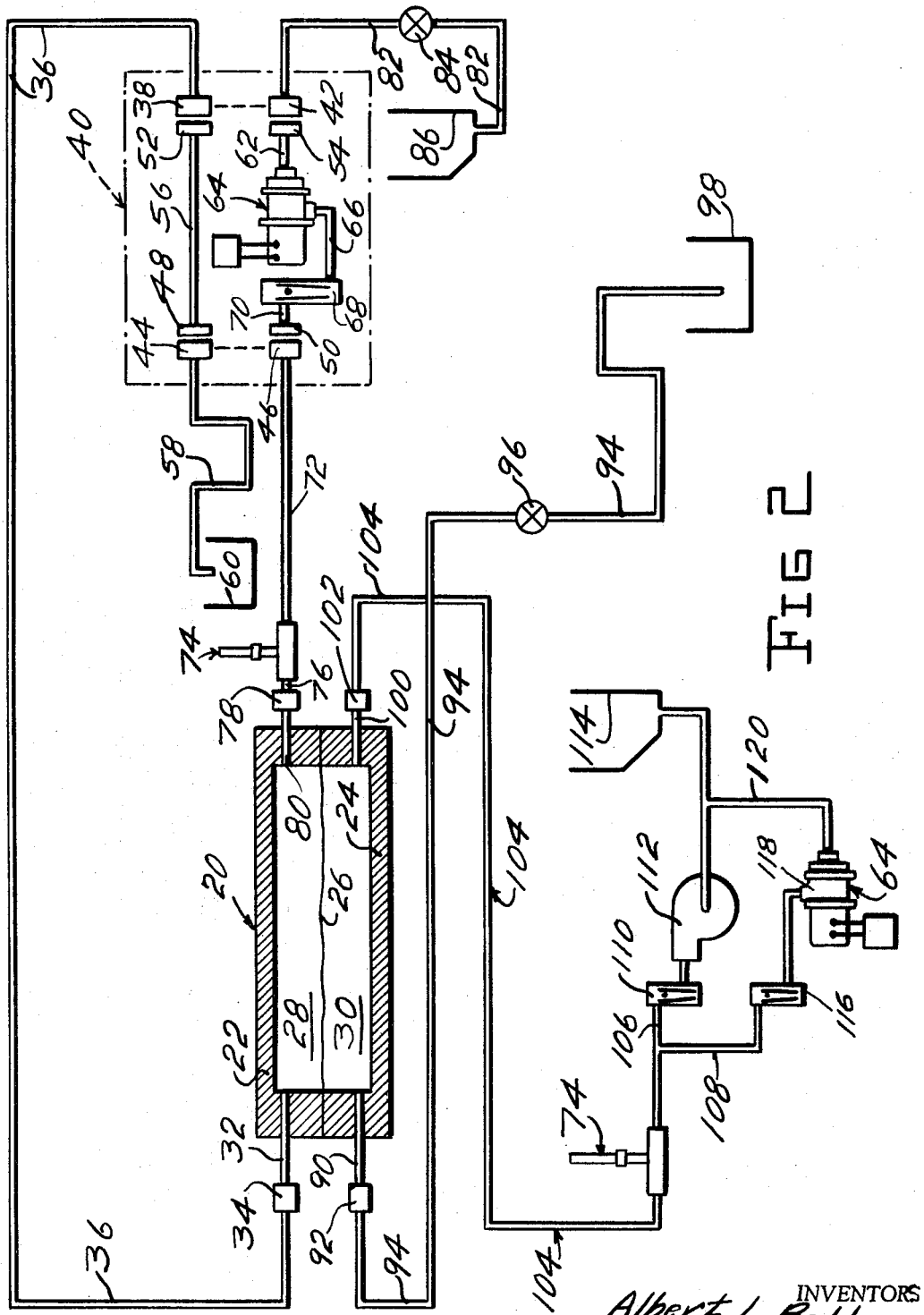
FIG. 2 is a schematic illustration of the research test dialyzer system wherein there are two liquids in the same dialyzer and with one common interface.

In FIG. 2 there is illustrated a research test dialyzer system identified as the loop mode or the loop method of dialysis.

In the loop system there is shown a dialyzer or a dialysis unit 20 having a first plate 22, a second plate 24 and a membrane 26. The membrane 26 in conjunction with the first plate 22 defines a first compartment 28 and in conjunction with the second plate 24 defines a second compartment 30.

There is an inlet tube or a port 32 leading into the first compartment. On the outer end of the tube 32 there is a quick disconnect 34. The quick disconnect 34 connects with the tube 36. The tube 36 connects with a port 38 of the switch 40. In the switch 40, there is a port 38, port 42, port 44 and port 46. Also, the switch 40 has ports 48, 50, 52, and 54. The port 52 connects with a tube or passageway 56 and which passageway 56 connects with the port 48.

The port 44 connects with a tube 58 which connects with a reservoir or outlet container 60.

The port 54 connects with a tube 62 and which tube in turn connects with a helix pump 64. The tube 62 connects with the inlet port of the helix pump 64. The helix pump 64 connects with an outlet tube 66. The tube 66 connects with a flow meter 68, and the flow meter 68 connects with a tube 70. The tube 70 connects with the port 50.

The port 46 connects with the tube 72. The tube 72 connects with a flow through galvanometer 74. The flow through galvanometer 74 connects with a tube 76, and the tube 76 connects with a quick disconnect 78. The quick disconnect 78 connects with a port or a tube 80 which leads into the first compartment 28.

The port 42 connects with a tube 82. In the tube 82 there is a throttle valve 84. The tube 82 connects with the inlet supply 86.

In FIG. 2 there is illustrated the ports 38 and 52 in connection with each other; the ports 44 and 48 in connection with each other; the ports 42 and 54 in connection with each other; and, the ports 46 and 50 in connection with each other. With this connection of the ports, there is exerted a positive fluid pressure in the first compartment 28.

Now, if the switch 40 is rearranged so that the ports 38 and 54 are in connection with each other; if the ports 42 and 52 are in connection with each other; if the ports 44 and 50 are in connection with each other; and, if the ports 46 and 48 are in connection with each other, then there is exerted a negative fluid pressure in the first compartment 28.

A positive fluid pressure is a pressure wherein the fluid is forced into the compartment. A negative fluid pressure is where the fluid is sucked out of the compartment or there is a lower pressure on the outlet end than the inlet end due to a pump pulling fluid out of the compartment.

A tube or port 90 connects with the second compartment 30. On the free end of the tube 90 there is a quick disconnect 92. The quick disconnect 92 connects with a tube 94. In the tube 94 there is a flow regulator 96. The tube 94 terminates or empties into a reservoir 98 or a discharge container 98.

A tube or port 100 connects with the second compartment 30. On the free end of the tube 100 there is a quick disconnect 102. The quick disconnect 102 connects with a tube 104. In the tube 104 there is a flow through galvanometer 74. The tube 104 connects with a tube 106 and a tube 108. The tube 106 connects with a flow regulator 110. The flow regulator connects with a metering pump 112. The metering pump 112 connects with an inlet supply reservoir 114.

The tube 108 connects with a flow regulator 116. The flow regulator 116 connects with a helix pump 118. The helix pump 118 by means of a tube 120 connects with the inlet supply reservoir 114.

The metering pump 112 pumps liquid at a low flow rate.

The helix pump 64 and the helix pump 118 pump liquid at a constant flow rate and which constant flow rate is a preset flow rate.

In the loop mode of FIG. 2 the metering pump 112 is not necessarily employed or used. In the loop mode of FIG. 3, the helix pumps 64 and 118 are used or employed.

Figure 1:
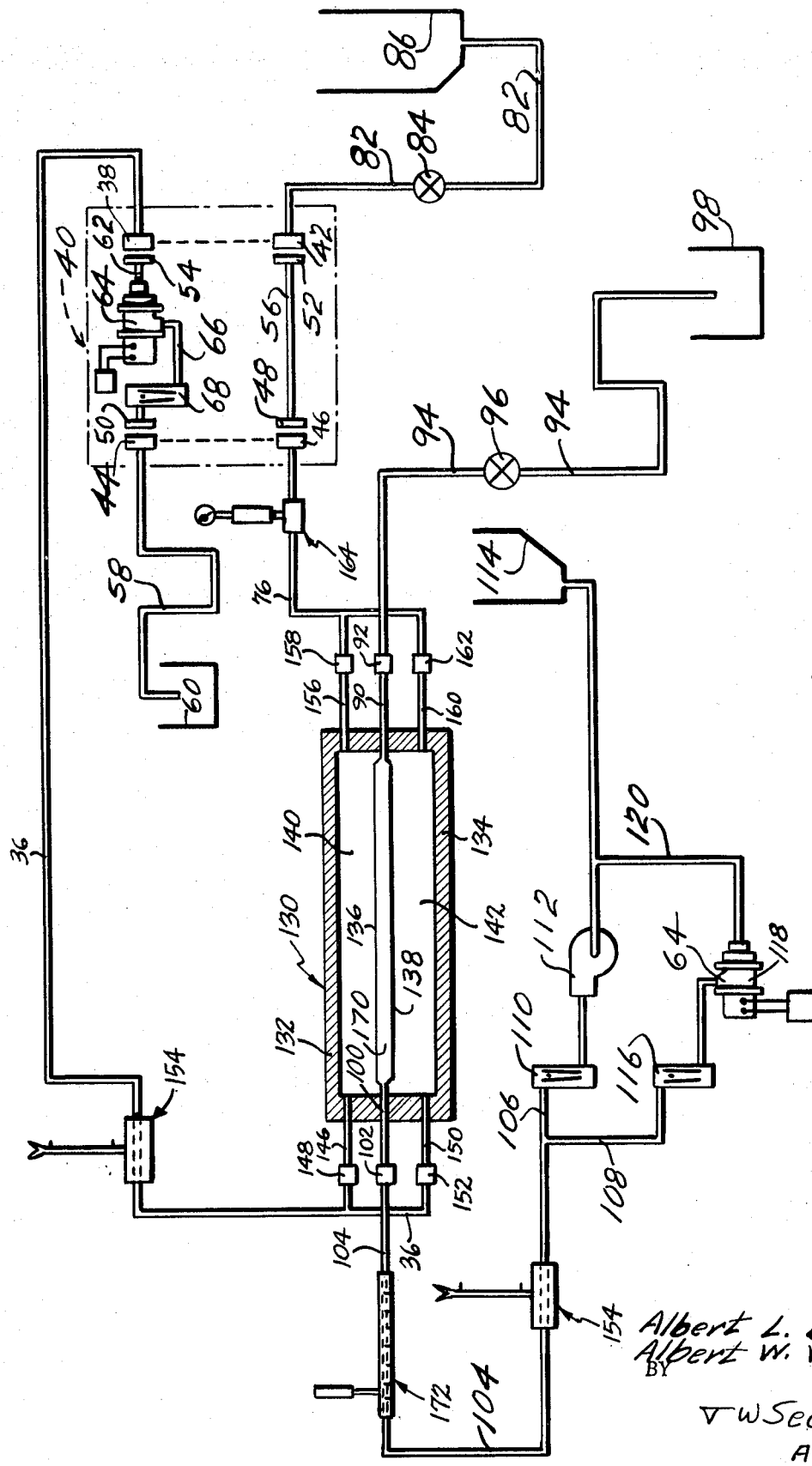
FIG. 1 is a schematic illustration of a research test dialyzer system in the dialysis mode wherein there are two liquids with the first liquid between two phases of the second liquid so as to have substantially two common interfaces.

In FIG. 1 there is shown a research test dialyzer system in the dialysate mode or dialysate method. This system comprises a dialyzer 130 having a first plate 132 and a second plate 134. In the dialyzer 130 there is a first membrane 136 and a second membrane 138.

The first membrane 136 and the first plate 132 define a compartment 140. The second membrane 138 and the second plate 134 define a third compartment 142. A tube or port 146 connects with the first compartment 140. On the free end of the tube 146 there is a quick disconnect 148.

A tube or port 150 connects with the third compartment 142. On the free end of the tube 150 there is a quick disconnect 152. The quick disconnects 148 and 152 connect with the tube 36, see FIG. 2. In the tube 36 there is positioned a flow through transducer 154. The tube 36 connects with the port 38 of the switch 40.

A tube or port 156 connects with the first compartment 140. On the free end of the tube 156 there is positioned a quick disconnect 158. A tube or port 160 connects with the third compartment 142. On the free end of the tube 160 there is a quick disconnect 162.

The quick disconnect 158 and the quick disconnect 162 connect with a tube 76, see FIG. 2. The tube 76 connects with a guage isolator 164. The gauge isolator 164 connects with the tube 72, see FIG. 2. The tube 72 connects with the port 46.

The switch 40, the helix pump 64 and the inlet supply 86 have been described with respect to FIG. 2 and will not be redescribed. However, with the switch 40 shown in the illustrated configuration, the port 38 connects with the port 54; the port 42 connects with the port 52; the port 44 connects with the port 50; and, the port 46 connects with the port 48 so that there is a negative pressure in the first compartment 140 and the third compartment 142. It is possible to have a positive pressure in the first compartment 140 and the second compartment 142 by having the ports 38 and 52 connect with each other; the ports 42 and 54 connect with each other; the ports 44 and 48 connect with each other; and, the ports 46 and 50 connect with each other.

The two membranes 136 and 138 define a second compartment 170.

A tube or port 100 connects with the second compartment 170. On the free end of the tube or port 100 there is positioned a quick disconnect 102. The quick disconnect 102 connects with a tube 104. In the tube 104 there is positioned a flow meter 172. Also, in the tube 104 there is positioned a flow through transducer 154. The flow through transducer 154 connects with the metering pump 112 and the helix pump 118 and the inlet supply reservoir 114 as illustrated and described with respect to FIG. 2.

A tube or port 90 connects with the second compartment 170. On the outlet or free end of the tube or port 90 there is a quick disconnect 92. The quick disconnect 92 connects with a tube 94 which in turn empties into the reservoir 98 or discharge container 98, see FIG. 2 and the discussion with respect to FIG. 2.

The dialyzer 130 of FIG. 1 has two membranes 136 and 138 so that dialysis may take place between the second compartment and the first compartment and also between the second compartment and the third compartment. In effect in the dialyzer 130 there are two interfaces through which dialysis may take place.

In FIG. 18 there is illustrated a test research dialyzer system or method in the dialysate mode and which comprises a dialyzer 180. The dialyzer 180 has a first plate 182 and a second plate 184. Also, there is a first membrane 186 and a second membrane 188. The first membrane 186 and the first plate 182 define a first compartment 190. The second membrane 188 and the first membrane 186 define a second compartment 192. The second membrane 188 and the second plate 184 define a third compartment 194.

A tube 32 or a port 32 connects with the first compartment 190. On the free end of the tube 32 there is a quick disconnect 34. The quick disconnect 34 connects with a tube 36 which connects with the port 38 of the switch 40, see FIGS. 2 and 1.

A tube or port 80 connects with the first compartment 190. On the free end of the tube 80 there is a quick disconnect 78. The quick disconnect 78 connects with the tube 76 and the tube 76 connects with a flow through galvanometer 74. The flow through galvanometer connects with a tube 72 and which tube 72 connects with a port 46 of the switch 40, see FIGS. 2 and 1. As illustrated in FIG. 18 there is a negative pressure in the first compartment 190, see FIGS. 2 and 1 and the description associated with FIGS. 2 and 1.

A tube 200 or a port 200 connects with the second compartment 192. On the free end of the tube 200 there is a quick disconnect 202. The quick disconnect 202 connects with a tube 204. In the tube 204 there is positioned a flow meter 172. Also, in the tube 204 there is positioned a flow through transducer 154. The flow through transducer 154 connects with the metering pump 112 and a helix pump 118 and an inlet supply reservoir 114, see FIGS. 2 and 1 and the description of said Figures.

A tube or port 206 connects with the second compartment 192. On the free end of the tube 206 there is positioned a quick disconnect 208. The quick disconnect 208 connects with a tube 210. In the tube 210 there is a regulator valve or a flow valve 212. The tube 210 discharges into a discharge container 214.

A tube or port 220 connects with the third compartment 194. On the free end of the tube 220 there is a quick disconnect 222. The quick disconnect 222 connects with a tube 224 and the tube 224 connects with a port 226 of switch 228. In the switch 228 there are ports 226, 230, 232 and 234. Also, in the switch 228 there are ports 236, 238, 240 and 242.

The port 236 by means of a tube or passageway 244 connects with a helix pump 64. The tube 244 is the inlet to the helix pump 64. A tube 246 connects with the helix pump and is the outlet of the helix pump 64. The tube 246 connects with a flow regulator 248. The flow regulator 248 connects with a tube 250. The tube 250 connects with the port 240.

The port 238 connects with a port 242 by means of tube or passageway 252.

In FIG. 18 it is seen that the port 232 connects with a tube 254 and that the tube 254 connects with the outlet reservoir or discharge container 256.

A tube or port 260 connects with the third compartment 194. On the free end of the tube 260 there is a quick disconnect 262. The quick disconnect 262 connects with a tube 264. The tube 264 connects with a flow through galvanometer 74. The flow through galvanometer 74 connects with a tube 266. The tube 266 connects with the port 234. The port 230 connects with a tube 268. In the tube 268 there is a flow regulator valve 270. The tube 268 connects with an inlet supply 272.

As is illustrated in FIG. 18 the port 266 connects with the port 236; the port 240 connects with the port 232; the port 230 connects with the port 238; and, the port 242 connects with the port 234. In the third compartment there is a negative pressure as the helix pump 64 is sucking or drawing the fluid through the third compartment from the inlet supply 272. If the ports were changed in the switch 228 and the port 226 were connected to the port 238; the port 230 connected to the port 236; the port 240 connected to the port 234; and, the port 242 connected to the port 232, then there would be a positive pressure in the third compartment 194 as the helix pump 64 would be pushing or forcing fluid through the third compartment.

In FIG. 18 there may be a first fluid in the first compartment 190; a second fluid in the second compartment 192; and, a third fluid in the third compartment 194. There is a first interface between the first compartment 190 and the second compartment 192 at the membrane 186 and there is a second interface between the second compartment 192 and the third compartment 194 at the membrane 188. It is possible to have the second fluid flow through the second compartment 192 and to transfer a first electrolyte to the first fluid flowing through the first compartment 190 and to transfer a second electrolyte to the second fluid flowing through the second compartment 192.

In FIGS. 12 through 17 and FIG. 19 there is illustrated a dialysis unit 300. The dialysis unit 300 may be used as the dialysis unit 20 of FIG. 2; may be used as the dialysis unit 130 of FIG. 1; and, may be used as the dialysis unit 180 of FIG. 18.

The dialysis unit 300 comprises a first plate 302 and a second plate 304.

In the first plate 302 there is a recessed central area 306. Also, there is a port 308 and a port 310. The port 308 is spaced apart from the port 310. Further, the port 308 connects with the recessed area 306 by means of a passageway 312. The port 310 connects with the recessed area by means of a passageway 314. In FIG. 13 it is seen that the ports 308 and 310 are in the interior of the first late 302. In FIG. 12 it is seen that the passageway 312 is actually a groove or a slot in the first plate 302. Likewise, in FIG. 17 it is seen that the passageway 314 is literally a slot or a groove in the first plate 302.

In FIG. 13 it is seen that to the left of the port 308 there is a port 318. The port 318 is on the interior surface of the first plate 302. Similarly, to the right of the port 310 there is a port 320. The port 320 is on the interior surface of the first plate 302. The port 318 and 320, in FIG. 13, are of a generally hemispherical configuration. In FIG. 17 it is seen that the ports 318 and 320 are in the configuration of a groove and extend across the interior surface of the first plate 302. Near each side of the first plate 302 and in the ports 318 and 320 there is a recess 322. In the port 318 there are two recesses 322. In the port 320 there are two recesses 323. The recesses 322 and 323 may be circular recesses or may be rectangular grooves. These recesses are to receive a shoulder of a tube and which tube will be described in greater detail in a latter part of this specification, see FIG. 19.

The port 318 connects with the port 308 by means of a plurality of passageways 324 in the interior of the first plate 302. The port 320 connects with the port 310 by means of a plurality of passageways 326 in the interior of the first plate 302.

The second plate 304 is substantially the same as the first plate 302. However, the second plate 304 may be considered to be a mirror image of the first plate 302. In the figures it is seen that the second plate comprises a first port 330 and a second port 332. The first port 330 and the second port 332 are spaced apart and are in the interior of the second plate 304.

The inner surface of the second plate is recessed at 334. The first port 330 connects with the inner surface 334 by means of a passageway 336. The second port 332 connects with the inner surface 334 by means of an inner passageway 338. The first passageway 336 may be considered to be a groove or a recess running from one side of the second plate 304 substantially the entire width of the second plate 304. The passageway 338 may be considered to be a groove running nearly the full width of the second plate 304 and terminating in the side of the second plate 304.

In FIG. 13 it is seen that to the left of the port 330 and in the inner surface of the second plate 304 there is a port 340. The port 340 is on the inner surface of the second plate 304.

In FIG. 13 it is seen that to the right of the port 332 there is a port 342 and that the port 342 is on the inner surface of the second plate 304. Further, in FIG. 13 the port 340 and the port 342 appear to be hemispherical. In the port 340 there is a recess or groove 346. This groove is spaced inwardly from the side of the second plate 304. The port 340 runs the width of the second plate 304 and there are two grooves or recesses 346.

In the port 342 there is a groove or recess 348. The port 342 runs the full width of the plate 304. There are two circular recesses 348, one near each side of the second plate 304. The recesses 346 and 348 may be circular recesses or may be square or rectangular recesses. These recesses are to receive the shoulder of the tube illustrated in FIG. 19 and which tube will be more completely described in a latter part of this specification.

The recesses 322, 323 346 and 348, in addition to positioning the tube of FIG. 19, can be used to align the first plate 302 and the second plate 304. In this way there is a self-aligning feature of the two plates of the dialysis unit 300.

In FIG. 13 it is seen that there are a plurality of passageways 350 running from the port 340 to the port 330 and which passageways 350 are in the interior of the second plate 304.

In FIG. 13 it is seen that there are a plurality of passageways 352 running from the port 332 to the port 342 and that these passageways are in the interior of the second plate 304.

In FIG. 17 there is illustrated a first diaphragm 360 and a second diaphragm 362. Also, there is illustrated a first gasket or spacer 364 having a central opening 366 and a second gasket or spacer 368 having a central opening 370.

In FIG. 17 it is seen that the spacer 364 is positioned between the membrane 360 and the interior surface of the first plate 302. Also, it is seen that the second spacer 368 is positioned between the interior surface of the second plate 304 and the second membrane 362.

The opening 366 in the first spacer 364 is of a generally rectangular configuration and surrounds the interior recessed surface 306 of the first plate 302 and also surrounds the ends of the ports 318 and 320. Likewise, the opening 370 in the second spacer 368 is of a generally rectangular configuration and surrounds the recessed surface 334 of the second plate 304 and also surrounds, on the end edges, the opening 340 and the opening 342.

In the recess 306 there is positioned a first membrane support 371 and in the recess 334 there is positioned a second membrane support 372.

In FIG. 19 there is illustrated an inlet tube 380 having an interior passageway 382 and having an exterior circular shoulder 384. Further, in the outer surface of the tube 380 there is a recess 386. In the recess 386 there is positioned a sleeve 388. The sleeve 388 is of a sealing material such as rubber or a plastic. It is conceivable that the sleeve 388 can be a closed cell polyurethane material or some other foam material which will prevent the passage of a fluid.

In FIG. 12 there is illustrated the tube 380 in position in the first plate 302 and in the second plate 304. Further, the shoulder 384 is in the recess 322 and the recess 346 in the first and second plates or in the recess 323 and the recess 348 in the first and second plates.

In FIG. 15 there is illustrated a tube 390 having a passageway 392 and a shoulder 394. The interior portion 396 of the tube projects or is positioned in an appropriate port such as 308, 310, 330 or 332. The tube 390 may be cemented in or positioned in a respective port by means of an adhesive, screwed into position or attached to the port in the plate by an appropriate means.

In FIG. 12 through 17 it is seen that the membrane support materials 371 band 372 may be of various thicknesses and of various configurations. For example, the support materials 371 and 372 may be a nickel foam, a stainless steel foam, a pillar support of plastic construction such as rubber, a pillar support of metallic construction such as steel, aluminum, stainless steel and the like. Again, the thickness of the membrane supports can be varied. Further, the thickness of the membranes 360 and 362 can be varied and the types of membranes 360 and 362 can be varied. The material from which the membranes 360 and 362 are made can be various materials and the permeabilities of these materials may range over a wide range. For example, the permeability of these materials may be substantially 0 or they may be substantially 100 percent permeable. With the variation in the natural permeability of the membranes and with the variation in thickness of the membranes it is possible to secure many factors in regard to the permeability of the membane. Also, some of these membranes may fall into the class of semipermeable membranes.

In addition, the thickness of the spacers 364 and 368 may be varied so as to make it possible to use various membrane supports 371 and 372 and which supports are of various thicknesses. In addition, by varying the thickness of the spacers 364 and 368 it is possible to have a larger or smaller space between the membranes 360 and 362 for various flow rates and flow conditions.

In FIG. 13 it is seen that the membrane 360 and the plate 302 define a first compartment 397. Also, it is seen that the membranes 360 and 362 define a second compartment 398. Further, the membrane 362 and the second plate 304 define a third compartment 400.

The dialysis unit 20 may be defined by having the first compartment 28 as compartment 397 and the second compartment 30 as compartment 398. Or the second membrane 362 may not be used so that the first compartment 28 may be compartment 397 and the second compartment 30 may be compartment 400 between the membrane 360 and the second plate 304. In this manner the dialysis unit 300 may be the dialysis unit 20.

The dialysis unit 130 of FIG. 1 and the dialysis unit 180 of FIG. 18 are defined by the dialysis unit 300 of FIG. 13. Again, FIG. 13 comprises a first compartment 397, the second compartment 398 and the third compartment 400. For the dialysis unit 130 there may be introduced into the first compartment 397 and the third compartment 400 the same fluid and there may be introduced into the second compartment 398 a different fluid. For the dialysis unit 180 of FIG. 18 there may be introduced into the first compartment 397 a first fluid, there may be introduced into the second compartment 398 a second fluid and there may be introduced into a third compartment 400 a third fluid.

As an example of the use of the dialysis unit 300 as dialysis unit 130 in the second compartment 398 there may be blood, and in the first compartment 397 and the third compartment 400 there may be an aqueous mixture of water and a chemical such as sodium acetate, sodium chloride, dextrose and the like to name a few. As another example, there may be blood in the second compartment 398, and in the first compartment 397 and in the third compartment 400 there may be a gaseous material such as oxygen. As a further example, there may be a nutrient solution in the second compartment 398 such as a blood serum or a plasma, and in the first compartment 397 and in the third compartment 400 a gaseous material such as oxygen. The nutrient material may flow to some organ such as a heart or to a kidney or to some other organ which is in storage and is to be transplanted. For example, the transplanted organ such as a heart or a kidney may be fed and kept alive by this nutrient material flowing through the second compartment 398.

In regard to the dialysis unit 180 of FIG. 18, an illustration of the use of the dialysis unit 300 for the dialysis unit 180 is to flow blood through the second compartment 398; to flow an aqueous chemical solution such as sodium acetate or sodium chloride or a dextrose solution, or other appropriate solution through the first compartment 397; and, to flow a gaseous material such as oxygen through the third compartment 400. In this way there is a transfer of ions from the blood in the second compartment 398 to the solution in the first compartment 397 and there is also oxygenation of the blood in the flow of oxygen from the third compartment 400 to the second compartment 398. Again, in the place of the blood in the second compartment 398, there may be a nutrient solution.

The foregoing is an illustration of some of the examples and uses for the dialysis unit 300 and also the variation in membrane support thickness, structure of membrane support, the membrane itself and the membrane thickness, the spacer material thickness and the like. Further, there is illustrated in FIG. 13 the parallel flow between the fluids entering ports 308 and 330 with respect to the fluid entering the ports 331 through the tube 380. The arrows in FIG. 13 illustrate the parallel flow.

An illustration of countercurrent flow is in FIG. 14 wherein the fluids enter the ports 308 and 330 while another fluid enters the port 333 so as to flow in the second compartment 398 in a countercurrent direction with respect to the flow of fluids in the first compartment 397 and the third compartment 400.

The materials of construction of the first plate 302 and the second plate 304 may be numerous. There may be used wood, metal such as stainless steel, metal such as aluminum and plastic. One of the easiest materials to work is a plastic such as methyl methacrylate. Or, to phrase is differently, the first plate 302 and the second plate 304 may be made of non-ferrous or ferrous materials or plastic or wood or combinations thereof. Naturally, the materials of construction of the first plate 302 and the second plate 304 should not react or interfere with the physical and chemical processes taking place in the dialysis unit 300.

The tube 380 is so positioned that the shoulder 384 is in an appropriate recess and the sleeve 388 is between the membranes 360 and 362. The sleeve 388 functions as a seal between these membranes to prevent the egress of fluids from between the membranes. In other words, the shoulder 384 assists in aligning the first plate 302 with respect to the second plate 304, and the sleeve 388 assists in sealing between the two membranes 360 and 362 so that fluid cannot inadvertently run out from between the two membranes.

In FIGS. 3, 4 and 5 there is illustrated the helix pump 64 having a motor 401 and an output shaft 402. The pump comprises an interior housing 404 which has a plurality of spaced apart passageways 406. In the passageways 406 there are positioned bolts 408 for attaching the exterior housing 404 to the motor 401. The exterior housing 404 has an interior wall 410. The interior wall 410 has a central opening or passageway 412. Further, the outer edge of the wall 410, i.e., that face of the wall away from the motor 400, has a circular cup 414 and in which cup there is positioned a water tight seal 416 for the shaft 402. There is positioned on the outer end of the shaft 402 a rotor helix 418. The outer end of the shaft 402 is tapped for receiving the screw threads of the rotary helix 418.

On the outer face of the pump interior housing 404 there are four spaced apart lips 420. These spaced apart lips 420 define a passageway 422.

There is a stator helix 424 having a central helical passageway 426. The stator helix 424 has a wall 428 which defines a cup. The wall 428 is in the configuration of a frustum of a cone. On the free end of the wall 428 there is an outwardly directed circumferential flange 430.

There is an exterior housing 432. The exterior housing 432 has an end wall 434. The end wall 434 is integral and unitary with cylindrical wall 436. The cylindrical wall 436 has an outwardly directed circular flange 438. On the inner surface of the flange 438 there is a circular recess 440 for receiving the flange 430 of the stator helix 424.

As is illustrated in FIGS. 3 and 5 the flange 438 can be positioned over the flange 430 and then the flange 438 can be positioned with respect to the lips 420 and twisted so that the four flanges 438 can be positioned behind the four lips 420. In FIG. 5 it is seen that the flanges 438 are positioned equidistantly around the circumference of the cylindrical wall 436 and that the flanges 438 can be locked in position behind the lip 420 and also the outer edge of the pump interior housing 404.

The wall 434 of the exterior housing 432 connects with a nipple 444 and which nipple has a tapped passageway.

In FIGS. 3 and 4 it is seen that the pump interior housing 404 has a passageway 446 and which passageway 446 connects with an outwardly directed discharge pipe 448 which is internally tapped.

The fluid or liquid enters through the nipple 444 and travels through the helical passageway 426 and inside of the stator helix 424 and the cup defined by the stator helix wall 428. Then, the fluid or liquid is discharged through the passageway 446 in the outlet tube 448.

The pump 64 comprises a rotor and a stator having respectively external and internal helical threads, the rotor having one less thread than the stator. The basic theory of such pump has been disclosed and claimed in Moineau, U.S. Pat. Nos. 1,892,217 and 2,028,407. The pressure between the rotor and stator and the various pockets between the two increases from the intake pressure to the discharge pressure. The drawing of the rotor inwardly with respect to the intake to the stator helix 424 and under the influence of the pressure differential causing stretching or distrotion of the stator helix 424. The member 424 acts in tension to take up the actual rotor thrust. In this manner the tightness of the feeding of the pumping elements, the rotor helix 418 and the stator helix 424, increases with the pressure differential existing between the large end of the rotor and the small end of the rotor when the pump is right.

There is also provided with the pump 64 a torque controller 450 having connecting wires 452 and 454. The torque controller makes it possible for the helical pump to create a positive displacement of the fluid being pumped and said positive displacement being at a predetermined pressure and at a predetermined flow rate. The torque controller 450 is for controlling the direct current shunt motor 401. In this manner the combination of the torque controller 450 and the direct current shunt motor 401 with this type of helix pump makes possible the positive displacement of the fluid being pumped at said predetermined pressure and said predetermined flow rate. More particularly, the torque controller with the direct current shunt motor makes it possible to have a positive displacement of the fluid being pumped at the predetermined flow rate. If the flow rate is desired at 10 milliliters per second and the pressure is changed from 70 millimeters of mercury to 80 millimeters of mercury, the flow rate will remain at 10 milliliters per second even though the predetermined pressure has been changed from 70 millimeters of mercury to 80 millimeters of mercury.

One of the desirable features of this pump is the fact that it is possible to use different combinations of the rotor helix 418 and the stator helix 424 so as to achieve various flow rate ranges. The exterior housing 432 can quickly be disconnected from the interior housing 404 and the stator helix 424 removed. Also, it is possible to quickly remove the rotor helix 418 from the shaft 402. Then, a rotor helix 418 of different capacity can be readily attached to the shaft 402 and a stator helix 424 of different capacity can be positioned over the rotor helix 418. As a result, there is another pump having a different capacity of flow rate ranges.

In FIG. 6 there is illustrated a flow meter 172 comprising a tube 470. The tube 470 has a passageway 472 of a substantially constant cross-sectional area for the entire length on which there are indicia 474. There is a means 476 for injecting a gaseous bubble or a trace element such as a liquid of different characteristics into the bore 472. The means 476 comprises a hypodermic syringe 478 having a plunger 480 and a needle 482.

The tube 470 may be of plastic. The tube 470 should be translucent, even transparent. The liquid flowing in the bore 472 can be seen. It is desired to know the flow rate of the liquid in the bore 472. There is injected into the bore 472 and into the liquid by means of the needle 482 an air bubble. The time it takes for the air bubble to flow a measured distance can be determined. Then, it can be calculated, or determined from a predetermined set of calculations, the flow rate of the liquid in the bore 472. For example, blood may be flowing through the tube 470 and in the bore 472. An air bubble can be injected into the flowing stream of blood. The time required for the air bubble to pass from indicia 0 to indicia 10 can be determined. With the known cross-sectional area of the bore 472 the rate of flow of the air bubble and also of the liquid in the tube 470 can be readily determined.

From a practical purpose, the tube 470 may be in a curve or may be in the configuration of a circle. The important feature in this regard is to have the bore 472 of a substantially uniform cross-sectional area for the distance that the indicia is used on the tube 470 for determining the flow rate of the liquid in the bore 472.

In FIGS. 7 and 8 there is illustrated a flow through transducer 154 having a flow through housing 500. In the flow through housing 500 there are two passageways 502 and 504. The passageway 502 is on one end and the passageway 504 is on the other end. In the passageway 502 and in the passageway 504 there is positioned a flexible tubular diaphragm 506. The diaphragm 506 may be of rubber or plastic or other suitable flexible material. In the passageway 502 and inside of the diagphram 506 there is an orifice 508 having a central passageway 510. Similarly, in the passageway 504 there is an orifice 508 having a central passageway 510. The flexible tubular diaphragm 506 is between the passageway 504 and the orifice 508. There are adapter plugs 512 having a tapped central passageway 514 for fitting with the passageway 502 and 504.

In the flow through housing 500 the tubular diaphragm 506 creates a first compartment 516. As is illustrated in FIG. 7 and in FIG. 8 the flow through housing 500 has an interior diameter 518 and which interior diameter 518 is larger than the exterior diameter of the tubular diaphragm 506. In other words, in the flow through housing 500 and between the interior walls 518 and the exterior walls 519 of the tubular diaphragm 506 there is a second compartment 520.

In FIG. 8 it is seen that a passageway 522 connects with the second compartment 520. The passageway 522 connects with a stem 524 having a capillary 526. In the lower end of the stem there is an electrical resistance wire 528. Actually, the electrical resistance wire 528 is in the capillary 526 and the stem 524. At the upper end of the stem 524 the electrical resistance wire 528 projects outwardly or comes outwardly of the capillary 526. Both ends of the electrical resistance wire 528 connect with an Ohmmeter or a resistance meter 530.

The upper end of the stem 524 flares outwardly at 532 to form a cup 534.

Actually, any suitable liquid may be used in the second compartment 520 and the capillary 526. One suitable liquid is mercury which is an electrical conducting solution. The important feature is to have an electrical conducting solution in the capillary 526.

It can be readily seen that with a change in pressure of the liquid flowing through the flexible tubular diaphragm 506 that there is a change in the height of the liquid in the capillary 526. With a change in the height of the liquid in the capillary 526 the electrical characteristics of the wire 528 are changed and this is indicated on the Ohmmeter or resistance meter 530. The reason for the change in the height of the liquid in the capillary 526 is the change in the pressure in the flexible tubular diaphragm 506 and a corresponding change in the second compartment 520. In other words, the pressure of the liquid in the first chamber 516 causes a change in the volume of the second chamber 520.

At a predetermined electrical resistance, it is possible to sound an alarm. For example, in the Ohmmeter 530 there may be an alarm bell. Upon reaching a predetermined resistance, the alarm bell is actuated. Of course, other alarms may be used in place of an alarm bell and such alarms being a light or a switch or the like.

In FIG. 9 there is illustrated a flow through pressure galvanometer 74 having a housing 550 of fixed volume. In one end of the housing 550 there is a passageway 552. The other end of the housing 550 has a cap 554. In the cap 554 there is a passageway 556. In the side wall of the housing 550 there is a passageway 558.

A tube 560 projects through the passageway 552 and connects with a flexible tubular diaphragm 562. A tube 564 projects through the passageway 556 and connects with the flexible tubular diaphragm 562. The flexible tubular diaphragm 56 defines a first compartment 566. The volume between the flexible tubular diaphragm 562 and the interior of the housing 550 defines a second compartment 568. There connects with the passageway 558 a stem 570. The stem 570 has a capillary 572. In the upper end of the capillary 572 there is a chamber 574. In the chamber 574 there is a ball 576 which functions as a check valve.

The stem 570 should be translucent or transparent. On the stem 570 there is positioned a movable sleeve 578.

In operation a first fluid flows in the tube 560, through the tubular flexible diaphragm 562 and out through the tube 564. With the change in the pressure in the first compartment 566 there is a change in the volume in the second compartment 568. There a second fluid in the second compartment 568 and in the capillary 572.

Initially, the pressure of the first fluid flowing in the first compartment 566 is measured by positioning the sleeve 578 at the meniscus of the second fluid in the capillary 572. Then, with the change in the conditions under which the first fluid is flowing through the first compartment 566, the meniscus of the second fluid in the capillary 572 changes. Now, to determine the pressure of the first fluid flowing through the first compartment is applied a pressure to the top or upper end of the stem 572 and to the top of the capillary 580 in the upper stem. If the meniscus in the capillary 572 has risen the pressure applied to the capillary 580 must be a positive pressure so as to force the meniscus of the second fluid in the capillary 572 down to the indicia 582 on the sleeve 578. In this manner, with the pressure known of the fluid applied to the capillary 580, it is possible to determine the pressure of the first fluid flowing in the first compartment 566. However, if the meniscus of the second fluid in the capillary 572 has fallen with respect to the indicia 582 of the sleeve 578 then it is necessary to apply a negative pressure or a vacuum to the capillary 580 so as to have the meniscus rise to the indicia 582. The degree of vacuum is known and it is possible to then tell the pressure of the first fluid flowing through the first compartment 566. Again, the volume in the first housing 550 in known. With an increase in the pressure of the first fluid flowing through the first compartment 566 or in the tubular flexible diaphragm 562 the volume of the second compartment 568 changes. For example, if the pressure of the first fluid in the first compartment 566 increases then the volume of the second compartment 568 decreases. Conversely, if the pressure of the first fluid in the first compartment 566 decreases then the volume of the second compartment 568 increases.

It is seen that the flow through pressure galvanometer 74 and the flow through transducer 154 make it possible to isolate the fluid which is used for securing a reading from the fluid which is flowing through the galvanometer or the transducer. In other words the fluid flowing through the transducer or the galvanometer is separated by a flexible diaphragm from the fluid which is used to make the reading, either for the electrical transducer 154 or for the pressure galvanometer 74.

In FIGS. 10 and 11 there is illustrated a gauge isolator or pressure isolator gauge 164. The gauge isolator 164 has a housing 600 of a fixed interior volume 602. On the lower end of the housing there is a tubular connection 604. The upper end of the housing 600 is open at 606. There is a plug 608 for the upper end of the housing and for mating with the open upper end 606. In the plug 608 there is a longitudinal passageway 610.

A flexible, yieldable, deformble diaphragm 612 is positioned in the interior 602 of the housing 600. The upper end 614 of the flexible, yieldable, deformable diaphragm is positioned around the lower end of the plug and between the lower end of the plug and the interior wall of the housing 600. Then, a pressure gauge is connected to the passageway 610. The tubular connector 604 can be connected to the source of pressure.

In FIG. 11 it is seen that between the inner wall of the housing 600 and the outer wall of the flexible, yieldable, deformable diaphragm 612 that there is a first compartment. Also, within the flexible, yieldable, deformable diaphragm 612 and with respect to the pressure gauge 616 there is a second compartment 620.

With a change in the pressure in the system being monitored or studied there is a change in the pressure in the first compartment 618 and therefore a change in the volume of the first compartment 618. Likewise, with a change in the pressure and the volume of the first compartment 618 there is a change in the volume and the pressure of the second compartment 620 and which change is registered on the pressure gauge 616.

In actuality, the fixed housing 600 is a hypodermic syringe, without the plunger, and the flexible, yieldable, deformable diaphragm 612 is a rubber balloon.

In FIG. 10 and FIG. 11 it is seen that the gauge isolator or pressure isolator gauge 164 is a relatively inexpensive means of isolating the fluid under observation from the fluid used to actuate the gauge isolator. In other words, the fluid under observation is not contaminated by the fluid used to actuate a pressure gauge or a pressure indicating means.

From the foregoing, it is seen that we have provided a testing unit for testing dialyzers and dialysis units. With this testing unit, it is possible to secure information for designing and building dialyzers and dialysis units. This testing unit comprises a unitary instrument. This unitary instrument is packaged into a relatively small workable system abd is used in this relatively small workable system. The dialysis unit 300, see FIG. 13, as previously explained, can be used as the dialysis unit 20 of FIG. 2; can be used as the dialysis unit 130 of FIG. 1; and, can be used as the dialysis unit 180 of FIG. 18.

In this testing unit, the dialysis unit 300 can assume a different configuration. Also, the dialysis unit 300 can be used to test different membranes of different materials and different thicknesses; can be used to test dialysis units having various thicknesses of compartments and therefore various volumes of compartments and different flow rates in the compartments; can be used with fluids and liquids at different temperatures as these fluids and liquids can be set at a predetermined temperature and maintained at that temperature before and during introduction into the dialysis unit; can be used to simultaneously determine the effect of one solute in a donor or a dialyso solution with respect to two donee solutions or two dialysate solutions. To our knowledge, this has never been done before.

The materials of construction will depend upon the desired use. In certain instances, the materials of construction of the dialysis unit 300 will be of plastic such as methylmethacrylate or a metal such as stainless steel, or other suitable material. The membranes will be varied for various thicknesses, materials of membrane and permeability. The spacers can be of various thicknesses so as to have various thicknesses of compartment in the dialysis unit and therefore various flow rates and conditions under which the fluids and liquids flow.

This tesing unit for dialyzers can be used in research laboratories, classroom and laboratory use, physical chemistry laboratories, medical research, organic chemistry, membrane research, biochemical research, pulp and paper research, to name a few. One of the reasons that makes this testing unit desirable is the fact that it is packaged in a relatively small and compact system and operated after a short course of instruction in the manner of operation.

Having presented our invention, what we claim is:

1. A test unit comprising in combination:
   a. a first membrane;
   b. a frame for said first membrane;
   c. said first membrane dividing said frame into a first compartment and a second compartment;
   d. a first means for introducing a first fluid into said first compartment;
   e. said first means comprising a first pumping means for exerting a first fluid pressure in said first compartment;
   f. a second means for allowing said first fluid to leave said first compartment;
   g. a third means for interchanging said first pumping means and said second means for exerting a second fluid pressure in said first compartment;
   h. A fourth means for introducing a second fluid in said second compartment: and,
   i. a fifth means for allowing said second fluid to leave said second compartment.

2. A test unit according to claim 1 and comprising in combination:
   a. said fourth means comprising a second pumping means for exerting a third fluid pressure in said second compartment; and,
   b. a sixth means for interchanging said second pumping means and said fifth means for exerting a fourth fluid pressure in said second compartment.

3. A test unit according to claim 2 and comprising in combination:
   a. said first fluid pressure may be a positive fluid pressure;
   b. said second fluid pressure may be a negative fluid pressure.
   c. said third fluid pressure may be a positive fluid pressure; and,
   d. said fourth fluid pressure may be a negative fluid pressure.

4. A test unit according to claim 1 and comprising in combination:
   a. said first fluid pressure may be a positive fluid pressure; and,
   b. said second fluid pressure may be a negative fluid pressure.

5. A test unit according to claim 1 and comprising in combination:
   a. said first membrane may be a permeable membrane.

6. A test unit according to claim 1 and comprising in combination:
   a. said third means comprising switching means for rapidly interchanging said first pumping means and said third means.

7. A test unit according to claim 1 and comprising in combination:
   a. said third means comprising switching means for rapidly interchanging said first pumping means and said third means; and,
   b. said fourth means comprising a second pumping means for assisting the flow of said second fluid through said second compartment.

8. A test unit according to claim 7 and comprising in combination:
   a. said frame comprising a first plate and a second plate;
   b. said first plate on its interior surface in conjunction with said first membrane defining said first compartment;
   c. said second plate on its interior suface in conjunction with said first membrane defining said second compartment;
   d. sixth means for spacing apart said first plate and said second plate a desired distance for achieving a desired fluid film thickness; and,
   e. said plate permitting various membranes and various thickness of membranes to be used under test conditions.

9. A test unit according to claim 7 and comprising in combination:
   a. said frame comprising a first plate and a second plate;
   b. said first plate on its interior surface in conjunction with said first membrane defining said first compartment;
   c. said second plate on its interior surface in conjunction with said first membrane defining said second compartment;
   d. sixth means for spacing apart said first plate and said first membrane a desired distance for achieving a desired fluid film thickness;

e. seventh means for spacing apart said second plate and said first membrane a desired distance for achieving a desired fluid film thickness; and, f. said plates permitting various membranes and various thickness of membranes to be used under test conditions.

10. A test unit according to claim 7 and comprising in combination:

a. said frame comprising a first plate and a second plate;

b. said first plate having a first port and a second port;

c. said first and second ports being spaced apart;

d. said first port connecting with the interior surface of said first plate;

e. said second port connecting with the interior surface of said first plate;

f. said first membrane extending across said first and second ports;

g. said second plate having a third port and a fourth port;

h. said third and fourth ports being spaced apart;

i. said third port connecting with the interior surface of said second plate;

j. said fourth port connecting with the interior surface of said second plate;

k. said first membrane extending across said third and fourth ports;

l. said fourth means introducing said second fluid between said membrane and said second plate; and, m. said fifth means allowing said second fluid to leave between said membrane and said second plate.

11. A test unit according to claim 10 and comprising in combination:

a. said first means introducing said first fluid into said first port; and, b. said fourth means introducing said second fluid into said fourth port to have countercurrent flow.

12. A test unit according to claim 10 and comprising in combination:

a. said first means introducing said first fluid into said first port; and, b. said fourth means introducing said second fluid into said third port to have parallel flow.

13. A test unit according to claim 12 and comprising in combination:

a. said ninth means comprising a source of pressure to counter the pressure on the third fluid to adjust the level of the third fluid to said initial level.

14. A test unit according to claim 1 and comprising in combination:

a. said frame comprising a first plate and a second plate;

b. said first plate on its interior surface in conjunction with said first membrane defining said first compartment;

c. said second plate on its interior surface in conjunction with said first membrane defining said second compartment;

d. sixth means for spacing apart said first plate and said second plate a desired distance for achieving a desired fluid film thickness; and, e. said frame permitting various membranes and various thickness of membranes to be used under test conditions.

15. A test unit according to claim 1 and comprising in combination:

a. said first pumping means comprising a first helix pump;

b. a first direct current shunt motor with a sixth control means;

c. said first direct current shunt motor connecting with said first helix pump and for driving said first helix pump so as to create a positive displacement of said first fluid at a first predetermined pressure and at a first predetermined flow rate; and, d. said pressure ranging from positive pressure to negative prssure.

16. A test unit according to claim 15 and comprising in combination:

a. said sixth control means comprising a first torque controller; and, b. the combination of said first torque controller and said first direct current shunt motor and said first helix pump makes it possible to have said first helix pump pump fluid at a first constant predetermined flow rate and at a first constant predetermined pressure.

17. A test unit according to claim 15 and comprising in combination:

said fourth means comprising a second helix pump for exerting a third fluid pressure in said second compartment;

b. a second direct current shunt motor with a seventh control means;

c. said second direct current shunt motor connecting with second second helix pump and for driving said second helix so as to create a positive displacement of said second fluid at a second predetermined pressure and at a second predetermined flow rate; and d. said second predetermined pressure ranging from positive pressure to negative pressure.

18. A test unit according to claim 17 and comprising in combination:

a. said sixth control means comprising a first torque controller;

b. the combination of said first torque controller and said first direct current shunt motor and said first helix pump makes it possible to have said first helix pump pump fluid at a first constant predetermined flow rate and at a first constant predetermined pressure;

c. said seventh control means comprising a second torque controller; and, d. the combination of said second torque controller and said second direct current shunt motor and said second helix pump makes it possible to have said second helix pump pump fluid at a second constant predetermined flow rate and at a second constant predetermined pressure.

19. A test unit according to claim 1 and comprising in combination:

a. said first means including a flow through pressure galvanometer;

b. said galvanometer having a housing of fixed volume;

c. a flexible wall dividing said housing into a third compartment and a fourth compartment;

d. a sixth means to introduce said first fluid into said third compartment;

e. a seventh means to allow said first fluid to flow out of said third compartment;

f. a stem connecting with said fourth compartment;

g. a third fluid in said fourth compartment and said stem;

h. an eighth means to sense the initial level of said third fluid in said stem at a set condition; and, i. with a variation of the level of said third fluid in said stem caused by a variation in the pressure in the third compartment a ninth means to adjust the level of said third fluid to said initial level and thereby determine the pressure of the first fluid in the third compartment.

20. A test unit according to claim 19 and comprising in combination:

a. said eighth means comprising a translucent tube and a tenth indicator means to indicate the initial level of said third fluid.

21. A test unit according to claim 1 and comprising in combination:

a. a second membrane;

b. said first membrane and said second membrane defining said second compartment;

c. said second membrane and said frame defining a third compartment;

d. a sixth means for introducing said first fluid into said third compartment; and, e. a seventh means for allowing said first fluid to leave said third compartment.

22. A test unit according to claim 21 and comprising in combination:

a. said first membrane being between said first compartment and said second compartment; and, b. said second membrane being between said third compartment and said second compartment.

23. A test unit according to claim 21 and comprising in combination:

a. said frame comprising a first plate and a second plate;

b. said first plate on its interior surface in conjunction with said first membrane defining said first compartment;

c. said first membrane and said second membrane defining said second compartment;

d. said second plate on its interior surface in conjunction with said second membrane defining said third compartment;

e. means for spacing apart said first plate and said first membrane a desired distance for approaching a desired fluid film thickness and for spacing apart said second membrane and said second plate a desired distance for approaching a desired fluid film thickness and for spacing apart said first membrane and said second membrane a desired distance for approaching a desired fluid film thickness; and, f. said plates permitting various membranes and various thickness of membranes to be used under test conditions.

24. A test unit according to claim 21 and comprising in combination:

a. said frame comprising a first plate and a second plate;

b. said first plate having a first port and a second port;

c. said first and second ports being spaced apart and on the interior surface of said first plate;

d. said first plate having a third port and a fourth port;

e. said third and fourth ports being spaced apart;

f. said third port connecting with the interior surface of said first plate;

g. said fourth port connecting with the interior surface of said first plate;

h. said first port connecting with said third port;

i. said second port connecting with said fourth port;

j. said first membrane extending across said first, second, third and fourth ports in the first plate;

k. said second plate having a fifth port and a sixth port;

l. said fifth and sixth ports being spaced apart and on the interior surface of the second plate;

m. said second plate having a seventh port and an eighth port;

n. said seventh and eighth port being spaced apart;

o. said seventh port connecting with the interior surface of said second plate;

p. said eighth port connecting with the interior surface of said second plate;

q. said fifth port connecting with said seventh port;

r. said sixth port connecting with said eighth port;

s. said second membrane extending across said fifth, sixth, seventh and eighth ports in the second plate;

t. a ninth port in said second compartment;

u. a tenth port in said second compartment;

v. said fourth means introducing said second fluid in the second compartment between said first membrane and said second membrane;

w. said fifth means allowing said second fluid to leave said second compartment between said first membrane and said second membrane;

x. said sixth means introducing said first fluid into said third compartment between said second membrane and said second plate;

y. said seventh means allowing said first fluid to leave said third compartment between said second membrane and said second plate;

z. said first means introducing said first fluid into said first compartment between said first membrane and said first plate;

aa. said second means allowing said first fluid to leave said first compartment between said first membrane and said first plate; and, bb. with said first port connecting with said third port, said second port connecting with said fourth port, said fifth port connecting with said seventh port and said sixth port connecting with said eighth port, there is allowed a gaseous fluid in said ports and in said compartments to be removed thereby enabling free flow of liquid fluid in said ports and compartments.

25. A unitary test unit according to claim 24 and comprising in combination:

a. said first membrane being spaced from said first plate for the positioning of a membrane support material in said first compartment.

26. A unitary test unit according to claim 24 and comprising in combination:

a. said first membrane being spaced from said first plate for the positioning of a membrane support material in said first compartment; and, b. said second membrane being spaced from said second plate for the positioning of a membrane support material in said second compartment.

27. A test unit according to claim 24 and comprising in combination:

a. said first means introducing said first fluid into said first compartment at said third port;

b. said sixth means introducing said first fluid into said second compartment at said seventh port; and, c. said fourth means introducing said second fluid into said second compartment at said ninth port to have parallel flow.

28. A test unit according to claim 24 and comprising in combination:
 a. said first means introuducing said first fluid into said first compartment at said third port;
 b. said sixth means introducing said first fluid into said second compartment at said seventh port; and,
 c. said fourth means introducing said second fluid into said second compartment at said tenth port to have countercurrent flow.

29. A test unit according to claim 24 and comprising in combination:
 a. said ninth port comprising a first tube;
 b. said first tube having an eighth locking means;
 c. said first plate being recessed to receive said first tube and said eighth locking means;
 d. said tenth port comprising a second tube;
 e. said second tube having a ninth locking means; and,
 f. said first plate being recessed to receive said second tube and said ninth locking means.

30. A test unit according to claim 29 and comprising in combination:
 a. said first tube having a seal so as to be between said first membrane and said second membrane; and,
 b. said second tube having a seal so as to be between said first membrane and said second membrane.

31. A test unit according to claim 24 and comprising in combination:
 a. said ninth port comprising a first tube;
 b. said first tube having an eighth locking means;
 c. said first plate being recessed to receive said first tube and said eighth locking means;
 d. said tenth port comprising a second tube;
 e. said second tube having a ninth locking means; and,
 f. said second plate being recessed to receive said second tube and said ninth locking means.

32. A test unit according to claim 31 and comprising in combination:
 a. said first tube having a seal so as to be between said first membrane and said second membrane; and,
 b. said second tube having a seal so as to be between said first membrane and said second membrane.

33. A test unit according to claim 24 and comprising in combination:
 a. said ninth port comprising a first tube;
 b. said first tube having a shoulder;
 c. said first plate and said second plate each being recessed and aligned to receive said first tube having said shoulder;
 d. said tenth port comprising a second tube;
 e. said second tube having a shoulder; and,
 f. said first plate and said second plate each being recessed and alinged to receive said second tube having said shoulder.

34. A test unit according to claim 33 and comprising in combination:
 a. said recesses in said first plate and said second plate in conjuction with said shoulders aligning said first plate and said second plate.

35. A test unit according to claim 33 and comprising in combination:
 a. said first tube having a seal so as to be between said first membrane and said second membrane; and,
 b. said second tube having a seal so as to be between said first membrane and said second membrane.

36. A test unit according to claim 21 and comprising in combination:
 a. said first pumping means comprising a helix pump;
 b. a first direct current shunt motor with an eighth control means;
 c. said first direct current shunt motor connecting with said first helix pump and for driving said first helix pump so as to create a positive displacement of said first fluid at a first predetermined pressure and at a first predetermined flow rate; and,
 d. said pressure ranging from positive pressure to negative pressure.

37. A test unit according to claim 36 and comprising in combination:
 a. said eighth control means comprising a first torque controller; and,
 b. the combination of said first torque controller and said first direct current shunt motor and said first helix pump makes it possible to have said first helix pump pump fluid at a first constant predetermined flow rate and at a first constant predetermined pressure.

38. A test unit according to claim 21 and comprising in combination:
 a. said first means including a guage isolator;
 b. said gauge isolator having a housing of fixed volume;
 c. a flexible, yieldable, deformable diaphragm in said housing and dividing said housing into a fourth compartment and a fifth compartment;
 d. said fourth compartment being in contact with and for receiving said first fluid; and,
 e. a pressure indicating means connecting with said fifth compartment.

39. A test unit acccording to claim 38 and comprising in combination:
 a. said housing being a hypodermic syring; and,
 b. said flexible, yieldable, deformable diaphragm being a balloon.

40. A test unit according to claim 21 and comprising in combination:
 a. said fourth means including a flowmeter;
 b. said flowmeter comprising a tube;
 c. an eighth means for introducing a trace component into said tube; and,
 d. a ninth means for meausring the rate of flow of said trace component in said tube.

41. A test unit according to claim 40 and comprising in combination:
 a. said tube being translucent;
 b. said trace component being a gaseous bubble;
 c. said ninth means comprising indicia on said tube; and,
 d. the cross-sectional area of said tube being known.

42. A test unit according to claim 21 and comprising in combination:
 a. said fourth means including a flow through pressure meter;
 b. said meter having a housing of fixed volume;
 c. a flexible diaphragm dividing said housing into a fourth compartment and a fifth compartment;
 d. a means to introduce said second fluid into said fourth compartment;

e. a means to allow said second fluid to flow out of said fourth compartment;

f. an electrical transducer connecting with said fifth compartment;

g. a third fluid in said fifth compartment and connecting with said electrical transducer for varying the electrical characteristics of said electrical transducer with a change in the pressure of said second fluid in said fourth compartment; and, h. an indicating means for indicating the change in said electrical characteristics in said transducer.

43. A test unit according to claim 42 and comprising in combination:

a. said electrical transducer comprising a variable resistor; and b. said third fluid being a conductor of electricity.

44. A test unit according to claim 43 and comprising in combination:

a. said variable resistor comprising a tube;

b. said tube having a resistance; and, c. the variation of said third fluid in said tube varying the resistance of said resistance.

45. A test unit and comprising in combination:

a. a first membrane;

b. a frame for said first membrane;

c. a second membrane in said frame;

d. said first membrane and said frame defining a first compartment;

e. said first membrane and said second membrane defining a second compartment;

f. said second membrane and said frame defining a third compartment;

g. a first means for introducing a first fluid into said first compartment;

h. a second means for allowing said first fluid to leave said first compartment;

i. a third means for introducing a second fluid in said second compartment;

i. a fourth means for allowing said second fluid to leave said second compartment;

k. a fifth means for introducing a third fluid into said third compartment;

l. a sixth means for allowing said third fluid to leave said third compartment;

m. said first means comprising a first pumping means for exerting a positive fluid pressure in said first compartment;

n. a seventh means for interchanging said first pumping means and said second means for exerting a negative fluid pressure in said first compartment;

o. said fifth means comprising a second pumping means for exerting a positive fluid pressure in said third compartment; and, p. an eighth means for interchanging said second pumping means and said sixth means for exerting a negative fluid pressure in said third compartment.

46. A test unit and comprising in combination:

a. a first membrane;

b. a frame for said first membrane;

c. a second membrane in said frame;

d. said first membrane and said frame defining a first compartment;

e. said first membrane and said second membrane defining a second compartment;

f. said second membrane and said frame defining a third compartment;

g. a first means for introducing a first fluid into said first compartment;

h. a second means for allowing said first fluid to leave said first compartment;

i. a third means for introducing a second fluid in said second compartment;

i. a fourth means for allowing said second fluid to leave said second compartment;

k. a fifth means for introducing a third fluid into said third compartment;

l. a sixth means for allowing said third fluid to leave said third compartment;

m. said first means comprising a first pumping means for exerting a positive fluid pressure in said first compartment;

n. seventh means comprising switching means for rapidly interchanging said first pump means and said second means;

o. said fifth means comprising a third pumping means for assisting the flow of said third fluid through said third compartment; and, p. eighth means comprising switching means for rapidly interchanging said third pumping means and said sixth means.

47. A test unit according to claim 46 and comprising in combination:

a. said frame comprising a first plate and a second plate;

b. said first plate on its interior surface in conjunction with said first membrane defining said first compartment;

c. said first membrane and said second membrane defining said second compartment;

d. said second plate on its interior surface in conjunction with said second membrane defining said third compartment;

e. ninth means for spacing apart said first plate and said first membrane a desired distance for approaching a desired fluid film thickness;

f. tenth means for spacing apart said second membrane and said second plate a desired distance for approaching a desired fluid film thickness;

g. tenth means for spacing apart said first membrane and said second membrane a desired distance for approaching a desired fluid film thickness; and, h. said plates permitting various membranes and various thickness of membranes to be used under test conditions.

48. A test unit according to claim 46 and comprising in combination:

a. said frame comprising a first plate and a second plate;

b. said first plate having a first port and a second port;

c. said first and second ports being spaced apart and on the interior surface of said first plate;

d. said first plate having a third port and a fourth port;

e. said third and fourth ports being spaced apart and connecting with the interior surface of said first plate;

f. said first port connecting with said third port;

g. said second port connecting with said fourth port;

h. said first membrane extending across said first, second, third and fourth ports in the first plate;

i. said second plate having a fifth port and a sixth port;

j. said fifth and sixth ports being spaced apart and on the interior surface of the second plate;
k. said second plate having a seventh port and an eighth port;
l. said seventh and eighth ports being spaced apart and connecting with the interior surface of said second plate;
m. said fifth port connecting with said seventh port;
n. said sixth port connecting with said eighth port;
o. said second membrane extending across said fifth, sixth, seventh and eighth ports in the second plate;
p. a ninth port in said second compartment;
q. a tenth port in said second compartment;
r. said first means introducing said first fluid in the first compartment between said first plate and said first membrane;
s. said second means allowing said fluid to leave said first compartment between said first plate and said first membrane;
t. said third means introducing said second fluid in the second compartment between said first membrane and said second membrane;
u. said fourth means allowing said fluid to leave said second compartment between said first membrane and said second membrane;
v. said fifth means introducing said third fluid into said third compartment between said second membrane and said second plate;
w. said sixth means allowing said third fluid to leave said third compartment between said second membrane and said second plate; and,
x. with said first port connecting with said third port, said second port connecting with said fourth port, said fifth port connecting with said seventh port and said sixth port connecting with said eighth port there is allowed a gaseous fluid in said ports and in said compartments to be removed thereby enabling free flow of liquid fluid in said ports and compartments.

49. A test unit according to claim 48 and comprising in combination:
a. said first membrane being spaced from said first plate for the positioning of a membrane support material in said first compartment.

50. A test unit according to claim 48 and comprising in combination:
a. said first membrane being spaced from said first plate for the positioning of a membrane support material in said first compartment; and,
b. said second membrane being spaced from said second plate for the positioning of a membrane support material in said second compartment.

51. A test unit according to claim 48 and comprising in combination:
a. said first means introducing said first fluid into said first compartment at said third port;
b. said fifth means introducing said third fluid into said third compartment at said seventh port; and,
c. said third means introducing said second fluid into said second compartment at said ninth port to have parallel flow.

52. A test unit according to claim 48 and comprising in combination:
a. said first means introducing said first fluid into said first compartment at said third port;
b. said fifth means introducing said third fluid into said third compartment at said seventh port; and,
c. said third means introducing said second fluid into said second compartment at said tenth port to have countercurrent flow.

53. A test unit according to claim 48 and comprising in combination:
a. said first means introducing said first fluid into said first compartment at said third port;
b. said third means introducing said second fluid into said second compartment at said ninth port to have parallel flow between said first fluid and said second fluid; and,
c. said fifth means introducing said third fluid into said third compartment at said tenth port to have countercurrent flow between said second fluid and said third fluid.

54. A test unit according to claim 48 and comprising in combination:
a. said ninth port comprising a first tube;
b. said first tube having a ninth locking means;
c. said first plate being recessed to receive said first tube and said ninth locking means;
d. said tenth port comprising a second tube;
e. said second tube having tenth locking means; and,
f. said first plate being recessed to receive said second tube and said tenth locking means.

55. A test unit according to claim 54 and comprising in combination:
a. said first tube having a seal so as to be between said first membrane and said second membrane; and,
b. said second tube having a seal so as to be between said first membrane and said second membrane.

56. A test unit according to claim 48 and comprising in combination:
a. said ninth port comprising a first tube;
b. said first tube having a ninth locking means;
c. said first plate being recessed to receive said first tube and said ninth locking means;
d. said tenth port comprising a second tube;
e. said second tube having a tenth locking means; and,
f. said second plate being recessed to receive said second tube and said tenth locking means.

57. A test unit according to claim 56 and comprising in combination:
a. said first tube having a seal so as to be between said first membrane and said second membrane; and,
b. said second tube having a seal so as to be between said first membrane and said second membrane.

58. A unitary test unit according to claim 48 and comprising in combination:
a. said ninth port comprising a first tube;
b. said first tube having a shoulder;
c. said first plate and said second plate each being recessed and aligned to receive said first tube having said shoulder;
d. said tenth port comprising a second tube;
e. said second tube having s shoulder; and,
f. said first plate and said second plate each being recessed and aligned to receive said second tube having said shoulder.

59. A test unit according to claim 58 and comprising in combination:
a. said recesses in said first plate and said second plate in conjunction with said shoulder aligning said first plate and said second plate.

60. A test unit according to claim 58 and comprising in combination:
a. said first tube having a seal so as to be between said first membrane and said second membrane; and,
b. said second tube having a seal so as to be between said first membrane and said second membrane.

* * * * *